United States Patent
Yamashita et al.

(10) Patent No.: US 9,286,630 B2
(45) Date of Patent: Mar. 15, 2016

(54) INFORMATION PROCESSING SYSTEM, INFORMATION PROCESSING DEVICE, INFORMATION PROCESSING METHOD, AND INFORMATION RECORDING MEDIUM

(75) Inventors: Kosei Yamashita, Shinagawa-ku (JP); Yoichiro Sako, Shinagawa-ku (JP); Toshiro Terauchi, Shinagawa-ku (JP)

(73) Assignee: SONY CORPORATION, Tokyo (JP)

( * ) Notice: Subject to any disclaimer, the term of this patent is extended or adjusted under 35 U.S.C. 154(b) by 1066 days.

(21) Appl. No.: 11/571,832

(22) PCT Filed: Jul. 5, 2005

(86) PCT No.: PCT/JP2005/012719
§ 371 (c)(1),
(2), (4) Date: Jan. 9, 2007

(87) PCT Pub. No.: WO2006/006546
PCT Pub. Date: Jan. 19, 2006

(65) Prior Publication Data
US 2008/0052178 A1 Feb. 28, 2008

(30) Foreign Application Priority Data
Jul. 13, 2004 (JP) ................................ 2004-206444

(51) Int. Cl.
*G06Q 30/06* (2012.01)
*G06Q 20/00* (2012.01)
(Continued)

(52) U.S. Cl.
CPC ............ *G06Q 30/0601* (2013.01); *G06Q 20/00* (2013.01); *G06Q 20/12* (2013.01);
(Continued)

(58) Field of Classification Search
CPC ... G06Q 30/06; G06Q 30/0601; G06Q 20/00; G06Q 20/12; G06Q 20/209; G06Q 20/344; G06Q 20/349; G07F 19/00; G07F 19/201
See application file for complete search history.

(56) References Cited

U.S. PATENT DOCUMENTS 4,760,245 A 7/1988 Fukaya
6,110,041 A 8/2000 Walker et al.
(Continued)

FOREIGN PATENT DOCUMENTS

EP 0 360 613 A2 3/1990
EP 1 310 922 A2 5/2003
(Continued)

OTHER PUBLICATIONS

Summons to attend Oral Proceedings pursuant to Rule 115(1) EPC issued May 14, 2012, in European Patent Application No. 05757743.9.

(Continued)

*Primary Examiner* — Asfand Sheikh
(74) *Attorney, Agent, or Firm* — Oblon, McClelland, Maier & Neustadt, L.L.P.

(57) ABSTRACT

An information processing system, an information processing apparatus, an information processing method, and an information record medium that are controlled to generate an operation effect sound that differs for each user of a card upon an operation for electronic money are provided. A card 10 records user information 12, balance information 13, and audio data 14. The card 10 makes a settlement of electronic money with a vending machine 20 to buy a commodity. When the card 10 is presented to the vending machine 20, it reads the user information 12, the balance information 13, and the audio data 14 from the card 10 through wireless communications. The vending machine 20 makes a settlement on the basis of both information of the commodity that a user has selected and the balance information 13. As a result, the vending machine 20 provides the selected commodity to the user. On the other hand, with audio data 14, at a predetermined timing of the settlement, a predetermined sound is output. Audio data may be stored only in the vending machine 20 or both in the card 10 and in the vending machine 20. A sound that differs for each user and for each event is output.

72 Claims, 15 Drawing Sheets

(51) Int. Cl.
*G06Q 20/12* (2012.01)
*G06Q 20/34* (2012.01)
*G07F 19/00* (2006.01)
*G06Q 20/20* (2012.01)

(52) U.S. Cl.
CPC .......... *G06Q 20/209* (2013.01); *G06Q 20/341* (2013.01); *G06Q 20/349* (2013.01); *G06Q 30/06* (2013.01); *G07F 19/00* (2013.01); *G07F 19/201* (2013.01)

(56) References Cited

U.S. PATENT DOCUMENTS

| | | | | |
|---|---|---|---|---|
| 6,201,771 | B1 * | 3/2001 | Otsuka et al. | 369/30.32 |
| 6,272,535 | B1 * | 8/2001 | Iwamura | 709/217 |
| 7,270,263 | B2 * | 9/2007 | Rosenblatt | 235/379 |
| 7,628,334 | B2 * | 12/2009 | Mizuno et al. | 235/492 |
| 8,346,677 | B1 * | 1/2013 | Markarian et al. | 705/346 |
| 2001/0053223 | A1 * | 12/2001 | Ishibashi et al. | 380/231 |
| 2002/0118099 | A1 | 8/2002 | Oda et al. | |
| 2004/0023709 | A1 | 2/2004 | Beaulieu et al. | |

FOREIGN PATENT DOCUMENTS

| | | |
|---|---|---|
| JP | 2001 356850 | 12/2001 |
| JP | 2002 197419 | 7/2002 |
| JP | 2003-154568 | 5/2003 |
| JP | 2005 44183 | 2/2005 |
| KR | 2003-0012422 | 2/2003 |
| WO | WO 02/077935 A2 | 10/2002 |

OTHER PUBLICATIONS

Extended European Search Report issued Jan. 11, 2011 in Ep 05 75 7743.

* cited by examiner

14 AUDIO DATA

| IDENTIFICATION NO. | EFFECT SOUND DATA |
|---|---|
| 0001 | EFFECT SOUND DATA 1 |
| 0002 | EFFECT SOUND DATA 2 |
| 0003 | EFFECT SOUND DATA 3 |
| ⋮ | ⋮ |
| 0010 | EFFECT SOUND DATA 10 |

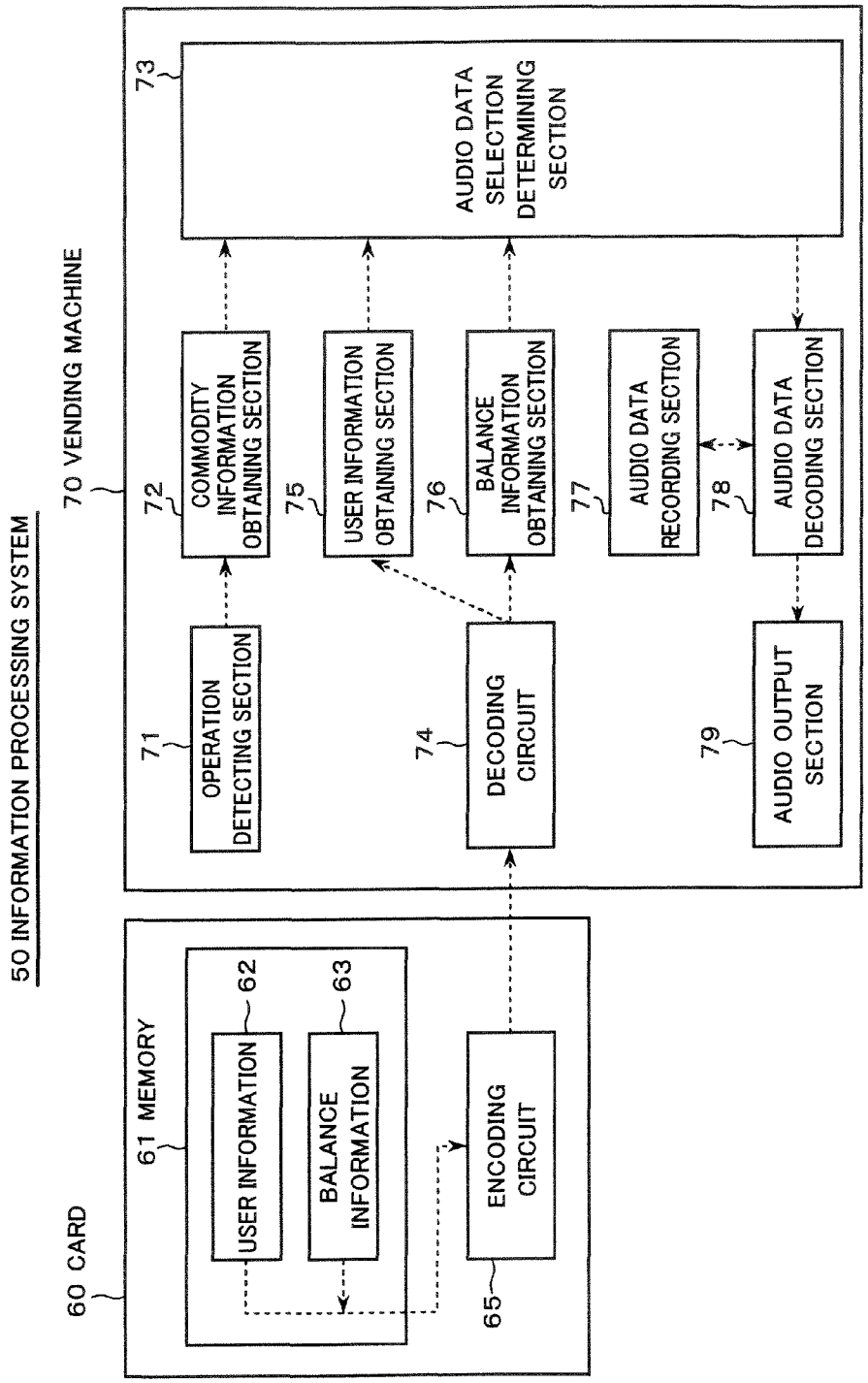

Fig. 8A

77 AUDIO DATA RECORDING SECTION

| IDENTIFICATION ID | EFFECT SOUND DATA |
|---|---|
| ID0001 | EFFECT SOUND DATA 1 |
| ID0002 | EFFECT SOUND DATA 2 |
| ID0003 | EFFECT SOUND DATA 3 |
| ⋮ | ⋮ |
| ID0010 | EFFECT SOUND DATA 10 |

Fig. 8B

77 AUDIO DATA RECORDING SECTION

| IDENTIFICATION NUMBER ID | IDENTIFICATION NUMBER | EFFECT SOUND DATA |
|---|---|---|
| ID0001 | 0001 | EFFECT SOUND DATA 1A |
| ID0001 | ⋮ | ⋮ |
| ID0001 | 0010 | EFFECT SOUND DATA 1J |
| ID0002 | 0001 | EFFECT SOUND DATA 2A |
| ID0002 | 0002 | EFFECT SOUND DATA 2B |
| ID0002 | 0003 | EFFECT SOUND DATA 2C |
| ID0003 | 0001 | EFFECT SOUND DATA 3A |
| ⋮ | ⋮ | ⋮ |

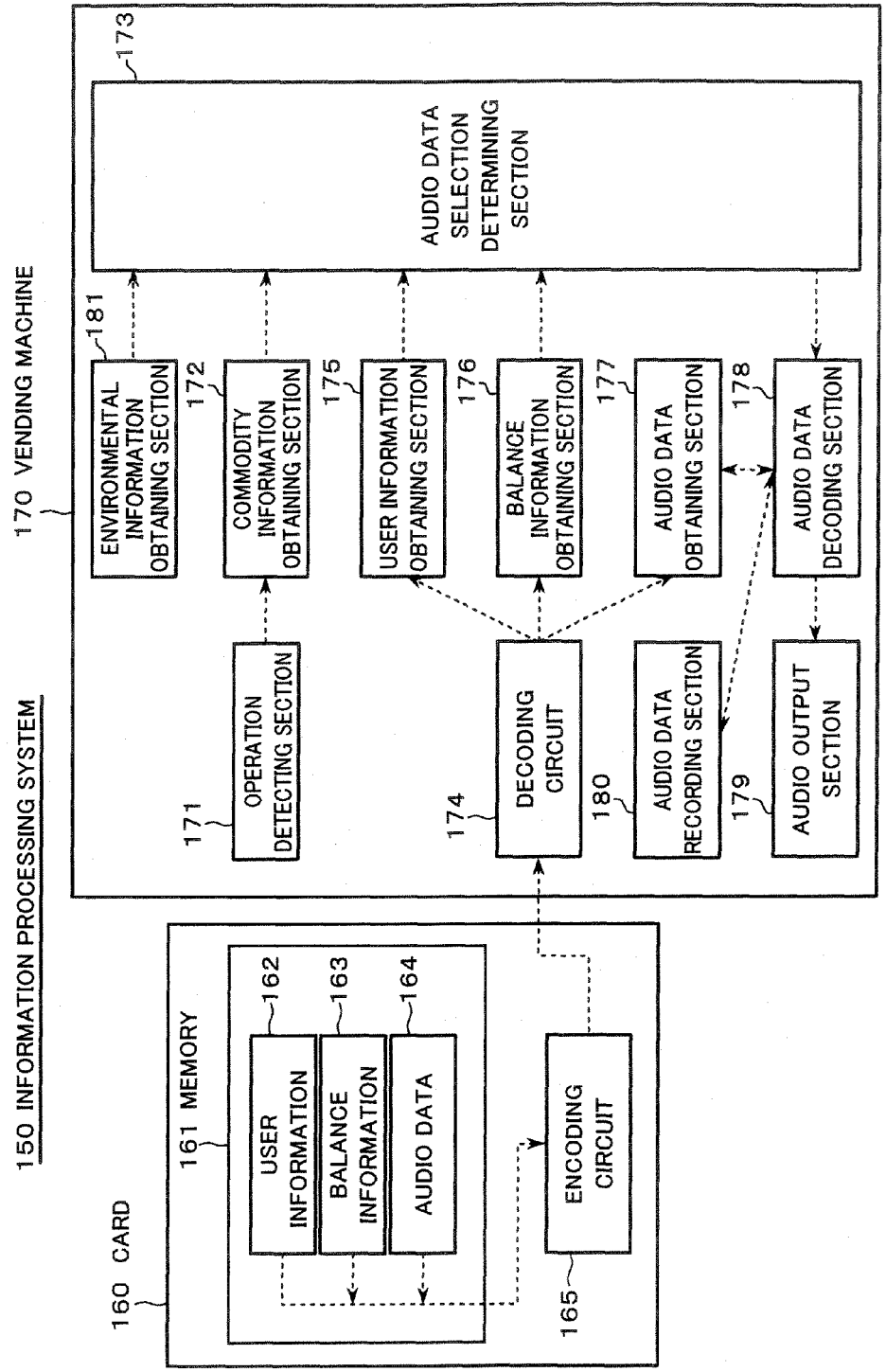

Fig. 12

| NO. | CONDITION | PRIORITY | NO. | SELECTION OF EFFECT SOUND |
|---|---|---|---|---|
| 1 | IF BALANCE OF ELECTRONIC MONEY IS LOWER THAN PREDETERMINED AMOUNT OF MONEY | 5 | 1 | MUSIC THAT CAUSES USER TO FEEL ANXIETY SUCH AS THEME MUSIC OF HORROR MOVIE |
| 2 | IF TODAY IS USER'S BIRTHDAY | 1 | 2 | MUSIC OF BIRTHDAY |
| 3 | IF INSTALLED PLACE OF VENDING MACHINE IS THEME PARK | 3 | 3 | MUSIC RELATED TO THEME PARK |
| 4 | IF USER IS YOUNGER THAN 20 YEARS OLD AND PRICE OF COMMODITY IS 30,000 YEN OR HIGHER | 2 | 4 | ALARM MESSAGE |
| 5 | IF TODAY IS NEW YEAR'S DAY | 4 | 5 | MUSIC HAVING JAPANESE MELODY |

Fig. 14

| NO. | CONDITION | PRIORITY | NO. | CONTENTS OF COMPENSATION |
|---|---|---|---|---|
| 1 | IF USER IS 80 YEARS OLD OR OLDER | 2 | 1 | TEMPO IS SLOWED DOWN, SOUND VOLUME IS INCREASED, AND HIGH PITCH TONE IS EMPHASIZED |
| 2 | IF BALANCE OF ELECTRONIC MONEY IS EQUAL TO OR LOWER THAN PREDETERMINED AMOUNT OF MONEY | 3 | 2 | TEMPO IS SPEEDED UP AND SOUND VOLUME IS INCREASED |
| 3 | IF WIND SPEED IS EQUAL TO OR GREATER THAN PREDETERMINED VALUE OR RAINFALL IS EQUAL TO OR GREATER THAN PREDETERMIND VALUE | 4 | 3 | SOUND VOLUME IS INCREASED |
| 4 | IF SURROUNDING BRIGHTNESS IS EQUAL TO OR LOWER THAN PREDETERMINED VALUE | 5 | 4 | BRIGHTNESS OF IMAGE IS DECREASED |
| 5 | IF USER IS HEARING-HANDICAPPED | 1 | 5 | SOUND VOLUME IS INCREASED AND MESSAGE IS DISPLAYED AS IMAGE |

INFORMATION PROCESSING SYSTEM, INFORMATION PROCESSING DEVICE, INFORMATION PROCESSING METHOD, AND INFORMATION RECORDING MEDIUM

TECHNICAL FIELD

The present invention relates to an information processing system, an information processing apparatus, an information processing method, and an information record medium that perform a predetermined information process when an operation for electronic money is performed.

BACKGROUND ART

One of technologies that have been spotlighted in recent years is RFID (radio frequency Identification). A wireless IC (Integrated Circuit) tag that uses this technology is made up of a set of a very small IC chip and an antenna. Various types of information are recorded in the IC chip of the wireless IC tag. These information is contactlessly read by a reader/writer through the antenna or rewritten by the reader/writer. Unlike a barcode, a wireless IC tag exchanges information as radio waves with the reader/writer. Thus, the information is not largely affected by dirt, water, dust, and so forth unlike a barcode. In addition, a wireless IC tag can communicate data with its reader/writer through an obstacle. Moreover, the reader/writer can simultaneously access a plurality of wireless IC tags.

There are two types of wireless IC tags, an active type that has a power supply and transmits radio waves to the reader/writer and a passive type that only receives radio waves from the reader/writer. A passive type that is currently being spotlighted receives radio waves from the reader/writer through an antenna of the tag and generates power using their inducted electromotive force. With the inducted power, a passive type wireless IC tag drives the IC to transmit information recorded in a memory to the reader/writer corresponding to radio waves received therefrom or rewrite the information.

Since a passive type wireless IC tag does not have a battery cell, it is lighter than an active type wireless IC tag for the weight of the battery cell. Thus, the production cost of a passive type wireless IC tag is lower than that of an active type wireless IC tag. In addition, since a passive type wireless IC tag can be permanently used, it is expected that the passive type wireless IC tag will be used for many fields.

As one of major features of a wireless IC tag, when it is used, it is not necessary to contact it to the reader/writer. In addition, the distance for which a wireless IC tag can communicate with the reader/writer ranges from several millimeters to several meters (that depend on for example the frequency, output, and antenna that the wireless IC tag uses). Thus, when a wireless IC tag passes near the reader/writer or it is placed on the reader/writer, information can be read or written from and to the memory of the wireless IC tag. In addition, when an wireless IC tag passes through a gate, data recorded in the memory can be read. With these features, wireless IC tags have been used as contactless IC cards for electronic money, commuting passes, prepaid cards, and so forth.

As electronic money, there are IC card type electronic money of which a dedicated IC chip records currency value data and network type electronic money of which software of managing currency value data is installed to a personal computer or the like and a settlement is made through a network.

Among them, the IC card type electronic money, namely electronic money using a contactless IC card, has been widespread in recent years. Cash registers and automatic vending machines that can make settlements with this type IC card have been installed at various locations.

For electronic money using a contactless IC card, it is necessary to charge the IC card through a charging machine or the like. This operation corresponds to an action of which a person puts money in his or her purse. At this point, the IC card is placed, for example, on a predetermined portion of the charging machine. When the user pays money with the IC card, he or she lightly touches a predetermined portion of an automatic vending machine or a cash register of a store with the IC card or passes it therethrough. When the user charges the IC card through a charging machine over again, he or she can pay money with the IC card as many times as he or she wants.

Next, with reference to FIG. 1 to FIG. 3, outlined structures of a contactless IC card used to make a settlement of electronic money, a charging machine through which a contactless IC card is charged with electronic money, and an automatic vending machine to which payment is made with electronic money will be described.

FIG. 1 is a schematic diagram showing a structure of a contactless IC card. Hereinafter, a contactless IC card used to make a settlement of electronic money is simply referred to as "card". A card 300 shown in FIG. 1 is made up of an IC chip 310 and a coil-shaped antenna 320. The IC chip 310 includes a CPU (Central Processing Unit) 311, a ROM (Read Only Memory) 312, a RAM (Random Access Memory) 313, an EEPROM (Electronically Erasable and Programmable Read Only Memory) 314, a coprocessor 315, an interface 316, and a bus 317 that mutually connects these structural elements. The interface 316 includes an encoding circuit 318.

The CPU 311 controls the operations of the other structural elements to transmit and receive information between the card and the reader/writer and read and write data such as balance information recorded in the card. The ROM 312 is a read-only memory used to store a program and so forth that accomplish for example the transmission and reception of information and reading of data. The RAM 313 is a high speed memory that reads and writes data temporarily used. The EEPROM 314 is a writable memory used to mainly store data such as balance information. The interface 316 controls communications between the card and the reader/writer. In particular, the encoding circuit 318 converts data stored in the EEPROM 314 into a transmission code and transmits the converted code to the reader/writer. The interface 316 also has a function of receiving data transmitted from the reader/writer, converting the data in a predetermined manner, and updating data stored in the EEPROM 314. The description of this function will be omitted.

The antenna 320 is used to allow the card and the reader/writer to communicate with each other and to supply power to the IC chip 310. As described above, the power is an induced electromotive force based on radio waves transmitted from the reader/writer.

FIG. 2 shows a structure of a front panel portion of the charging machine through which the card is charged with electronic money. The charging machine is a kind of a reader/writer that rewrites balance information of the card according to money with which the user charges the card. The charging machine 400 has an information display section 410, a button block 420, a card holding section 430, a bill slot section 440, and a speaker 450. First, the user of the card (electronic money) places the card 300 on the card holding section 430. Next, the user selects a button corresponding to the amount of money with which he or she wants to charge the card 300 from the button block 420 and presses the selected button. The button block 420 include buttons corresponding to for example ¥1,000, ¥3,000, ¥5,000, and ¥10,000. In addition, the button block 420 includes a cancel button that cancels an operation that the user has just performed. Thereafter, the user of the card 300 inserts a bill corresponding to the amount of money with which he or she wants to charge the card into the bill slot section 440. Thereafter, the charging machine 400 compares the amount of money corresponding to the button the user has pressed with the value of the bill that he or she has inserted. When they match, the charging machine 400 displays the amount of money on the information display section 410 and updates the balance information of the card 300. Thereafter, the charging machine 400 causes the information display section 410 to display a message that notifies the user that he or she can remove the card 300 from the card holding section 430.

In contrast, when the amount of money corresponding to the button that the user has pressed does not match the value of the bill that he or she has inserted, the charging machine 400 causes the information display section 410 to display a predetermined error message. For example, when the user has tried to deposit money whose amount exceeds the depositable amount in the charging machine or when the charging machine 400 cannot read information from the card 300, the charging machine 400 causes the information display section 410 to display a message that describes the contents of such an error and proper counteractions.

When the card 300 has been properly charged with money, the speaker 450 outputs a predetermined sound that denotes that the card 300 has been charged with money. For example, this operation is performed at the same timing as the timing at which the information display section 410 displays a message that denotes that the balance information of the card 300 has been updated and the card 300 can be removed from the card holding section 430. When the information display section 410 displays an error message, the speaker 450 may not output a sound or may output a predetermined sound that is different from the sound that is output when the card 300 has been charged. Thus, the user of the charging machine 400 can know that the card 300 has been correctly charged by image information (including text information) that the information display section 410 displays and audio information that the speaker 450 outputs.

FIG. 3 shows a structure of a front panel portion of the automatic vending machine that can make a settlement of electronic money. The automatic vending machine is a kind of a reader/write that rewrites balance information of the card according to an electronic money settlement command issued by the user of the card. The automatic vending machine 500 has an information display section 510, a commodity display section 520, a button block 530, a card information detecting section 540, a coin slot section 550, and a speaker 560. The user of the automatic vending machine 500 checks a commodity that he or she wants to buy and its price on the commodity display section 520. Thereafter, the user selects a button corresponding to the commodity that he or she wants to buy from the button block 530 and presses the selected button. Thereafter, the user moves the his or her own card 300 so that it passes near the card information detecting section 540 or lightly touches it. The automatic vending machine 500 obtains balance information from the card 300 through the card information detecting section 540. When the balance of the electronic money is greater than the price of the commodity that the user has selected, the automatic vending machine 500 makes the settlement and conveys the selected commodity to a commodity slot. At this point, when necessary, the automatic vending machine 500 causes the information display section 510 to display a message describing that the settlement has been made.

In contrast, when it has been determined that the balance of the electronic money of the card 300 is lower than the price of the selected commodity according to the balance information of the card 300 or when the automatic vending machine 500 has failed to read the balance information from the card 300, the contents of the error is displayed on the information display section 510. When the user inserts a necessary coin into the coin slot section 550 of the automatic vending machine 500, he or she can buy his or her selected commodity without the card 300.

When the settlement has been properly made with the card 300, the speaker 560 outputs a sound denoting that the settlement has been made. This operation is performed, for example, at the same timing at which the message describing that the settlement has been made is displayed on the information display section 510. For example, this sound is the same as the sound used in the charging machine 400. When an error has occurred, the speaker 560 does not output a sound like the charging machine 400. Instead, the speaker 560 may output a sound different from the sound denoting that the settlement has been made. Thus, the user of the automatic vending machine 500 can know that the settlement has been made, namely the commodity has been correctly bought by image information that the information display section 510 displays and audio information that the speaker 560 outputs.

When electronic money is used with a contactless IC card, a commodity and a service can be easily bought without cash. In addition, the card can be charged in the same manner that a commodity is bought from a regular automatic vending machine that accepts cash. However, if the user incorrectly places or presents the card on or to the charging machine 400 and the automatic vending machine 500, a settlement process for electronic money including a charging operation for electronic money and a commodity buying operation will be unsuccessfully performed. As a result, the user will be forced to repeat the same operation. To prevent this situation, related art described in Japanese Patent Application Laid-Open No. 2002-197419 proposes an automatic vending machine that is modified to have a guidance means that causes the user to place a card at a proper position by a display and a sound.

However, in conventional charging machines for electronic money and automatic vending machines using electronic money, image information and audio information that are output when a settlement operation has been properly performed and image information and audio information that are output when an error has occurred are constant, not changed. Thus, several problems occur.

If these charging machines and automatic vending machines are installed nearby, when users of the cards perform settlement operations in these charging machines and automatic vending machines, each user may not distinguish a sound that is generated from a machine that he or she performs the settlement operation from others. As a result, it is difficult for each user of a charging machine or an automatic vending machine to quickly determine whether he or she can finish the settlement operation or has to repeat it again.

Moreover, in conventional charging machines and automatic vending machines, image information and audio information that are output when a settlement operation has been properly performed are different from those that are output when an error has occurred. However, for example, when the settlement operation has been properly performed, the same sound is output. Thus, conventional charging machines and automatic vending machines do not have a taste of entertainment. As a result, when users operate these machines, they do not have a fresh impression from their settlement operation, but feel monotonous.

These problems are not solved by the improvement proposed in the related art of Japanese Patent Application Laid-Open No. 2002-197419. In other words, even if charging machines and automatic vending machines are modified in such a manner, it is not easy for the user who performs the settlement operation to distinguish his or hers from others by image information and audio information. In addition, entertainment properties of machines have not been sufficiently improved.

DISCLOSURE OF THE INVENTION

Therefore, an object of the present invention is to provide an information processing system, an information processing apparatus, an information processing method, and an information record medium that are controlled to generate an operation effect sound that differs for each user (card) of electronic money when an operation for the electronic money is performed.

In addition, another object of the present invention is to provide an information processing system, an information processing apparatus, an information processing method, and an information record medium that are controlled to change an operation effect sound on the basis of information about a user of electronic money, environmental information, and so forth.

A first aspect of the present invention is an information processing system, comprising an information record medium which records predetermined information; and an information processing apparatus includes: information reading means for reading predetermined information recorded in the information record medium, and output means for outputting at least one of a sound and an image according to a sequence of operations which a user of the information record medium performs therefor, wherein the output means outputs the sound and/or the image according to the information record medium from which the information reading means has read the predetermined information.

A second aspect of the present invention is the information processing system of the first aspect, wherein the predetermined information contains identification information with which the information record medium is identified, and wherein the output means identifies sound data used to output the sound and/or image data used to output the image according to the identification information.

A third aspect of the present invention is the information processing system of the first aspect, wherein the predetermined information contains the sound data and/or the image data, and wherein the output means identifies sound data used to output the sound and/or the image data used to output the image from the sound data and/or the image data contained in the predetermined information.

A fourth aspect of the present invention is the information processing system of the first aspect, wherein the output means outputs the sound and/or the image according to a predetermined condition, and wherein the predetermined condition contains at least one of a condition about the predetermined information and a condition about the operations which the user performs.

A fifth aspect of the present invention is the information processing system of the fourth aspect, wherein the output means selects different sound data and/or image data as data used to output the sound and/or the image when the sound and/or the image that differs according to the predetermined condition is output.

A sixth aspect of the present invention is the information processing system of the fourth aspect, wherein the output means processes or transforms sound data and/or image data used to output the sound and/or the image when the sound and/or the image which differs according to the predetermined condition is output.

A seventh aspect of the present invention is an information processing apparatus comprising information reading means for reading predetermined information recorded in an information record medium, and output means for outputting at least one of a sound and an image according to a sequence of operations which a user of the information record medium performs therefor, wherein the output means outputs the sound and/or the image according to the information record medium from which the information reading means has read the predetermined information.

An eighth aspect of the present invention is the information processing apparatus of the seventh aspect, wherein the predetermined information contains identification information with which the information record medium is identified, and wherein the output means identifies sound data used to output the sound and/or image data used to output the image according to the identification information.

A ninth aspect of the present invention is the information processing apparatus of the seventh aspect, wherein the predetermined information contains the sound data and/or the image data, and wherein the output means identifies sound data used to output the sound and/or image data used to output the image from the sound data and/or the image data contained in the predetermined information.

A tenth aspect of the present invention is the information processing apparatus of the seventh aspect, wherein the output means outputs the sound and/or the image according to a predetermined condition, and wherein the predetermined condition contains at least one of a condition about the predetermined information and a condition about the operations which the user performs.

An eleventh aspect of the present invention is the information processing apparatus of the tenth aspect, wherein the output means selects different sound data and/or image data as data used to output the sound and/or the image when the sound and/or the image that differs according to the predetermined condition is output.

A twelfth aspect of the present invention is the information processing apparatus of the tenth aspect, wherein the output means processes or transforms sound data and/or image data used to output the sound and/or the image when the sound and/or the image which differs according to the predetermined condition is output.

A thirteenth aspect of the present invention is an information processing method comprising the steps of reading predetermined information recorded in an information record medium, and outputting at least one of a sound and an image according to a sequence of operations which a user of the information record medium performs therefor, wherein the output step is performed by outputting the sound and/or the image according to the information record medium from which the predetermined information has been read at the information reading step.

A fourteenth aspect of the present invention is the information processing method of the thirteenth aspect, wherein the predetermined information contains identification information with which the information record medium is identified, and wherein the output step is performed by identifying sound data used to output the sound and/or image data used to output the image according to the identification information.

A fifteenth aspect of the present invention is the information processing method of the thirteenth aspect, wherein the predetermined information contains the sound data and/or the image data, and wherein the output step is performed by identifying sound data used to output the sound and/or image data used to output the image from the sound data and/or the image data contained in the predetermined information.

A sixteenth aspect of the present invention is the information processing method of the thirteenth aspect, wherein the output step is performed by outputting the sound and/or the image according to a predetermined condition, and wherein the predetermined condition contains at least one of a condition about the predetermined information and a condition about the operations which the user performs.

A seventeenth aspect of the present invention is the information processing method of the sixteenth aspect, wherein the output step is performed by selecting different sound data and/or image data as data used to output the sound and/or the image when the sound and/or the image that differs according to the predetermined condition is output.

An eighteenth aspect of the present invention is the information processing method of the sixteenth aspect, wherein the output step is performed by processing or transforming sound data and/or image data used to output the sound and/or the image when the sound and/or the image which differs according to the predetermined condition is output.

A nineteenth aspect of the present invention is an information record medium on which predetermined information containing at least one of sound data and image data is recorded, wherein at least one of the sound data and/or the image data is read by an information processing apparatus, and wherein the information processing apparatus outputs a sound and/or an image with the sound data and/or the image data when a user of the information record medium performs a sequence of operations of the information processing apparatus for the information record medium.

According to the first to nineteenth aspects of the present invention, when information record mediums are different, different sounds and images are output from an information processing apparatus that operates with information record mediums. Sounds and images that are different are output in at least two methods. In the first method, data used to output sounds and images are changed. In the second method, data used to output sounds and images are maintained, but processed and/or transformed.

According to the present invention, when an operation for electronic money is performed, an effect sound corresponding to a user of an information record medium such as a contactless IC card (electronic money) is selected and output. Thus, even if a plurality of nearby users perform a settlement operation for electronic money, each user can easily distinguish an effect sound of his or her settlement operation for electronic money from others. Thus, each user can appropriately know whether his or her settlement operation is being or has been properly performed.

In addition, according to the present invention, an effect sound of an operation for electronic money is changed on the basis of characteristics of a user of a card (electronic money) and output. Thus, an aged user or a hearing handicapped user can easily distinguish an effect sound of his or her settlement operation for electronic money from others.

In addition, according to the present invention, since an effect sound about an operation for electronic money is selected and/or changed on the basis of a predetermined condition such as environmental information and so forth, it is expected that a user of the card (electronic money) is prevented from monotonously operating his or her settlement operation and provides him or her with a sense of freshness and a taste of entertainment.

BRIEF DESCRIPTION OF DRAWINGS

FIG. 7 is a block diagram showing an example of a structure of an information processing system according to a second embodiment of the present invention;

FIG. 8A and FIG. 8B are schematic diagrams showing examples of audio data recorded in a vending machine in the information processing system according to the second embodiment of the present invention;

FIG. 11 is a block diagram showing an example of a structure of an information processing system according to a fourth embodiment of the present invention;

FIG. 12 is a schematic diagram describing an outlined effect sound selection process in the information processing system according to the fourth embodiment of the present invention;

FIG. 14 is a schematic diagram describing an outlined effect sound selection process in the information processing system according to the fifth embodiment of the present invention.

BEST MODES FOR CARRYING OUT THE INVENTION

First, with reference to FIG. 4, an information processing system according to a first embodiment of the present invention will be described.

According to this embodiment, audio data have been recorded in a card. When a vending machine outputs a predetermined operation effect sound, the vending machine uses the audio data recorded in the card.

Figure 1:
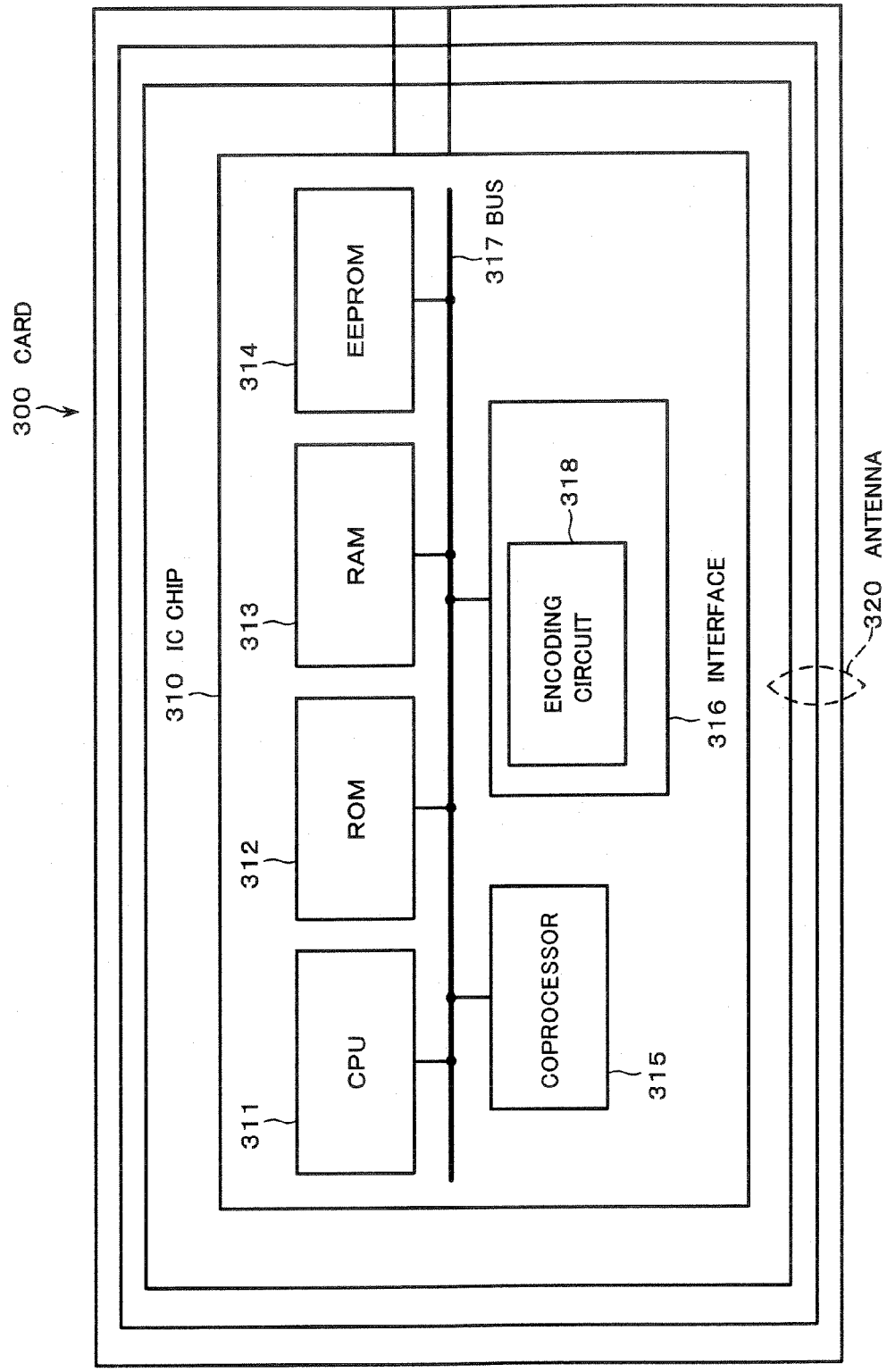
FIG. 1 is a schematic diagram showing a structure of a conventional contactless IC card that can make a settlement of electronic money.
Figure 2:
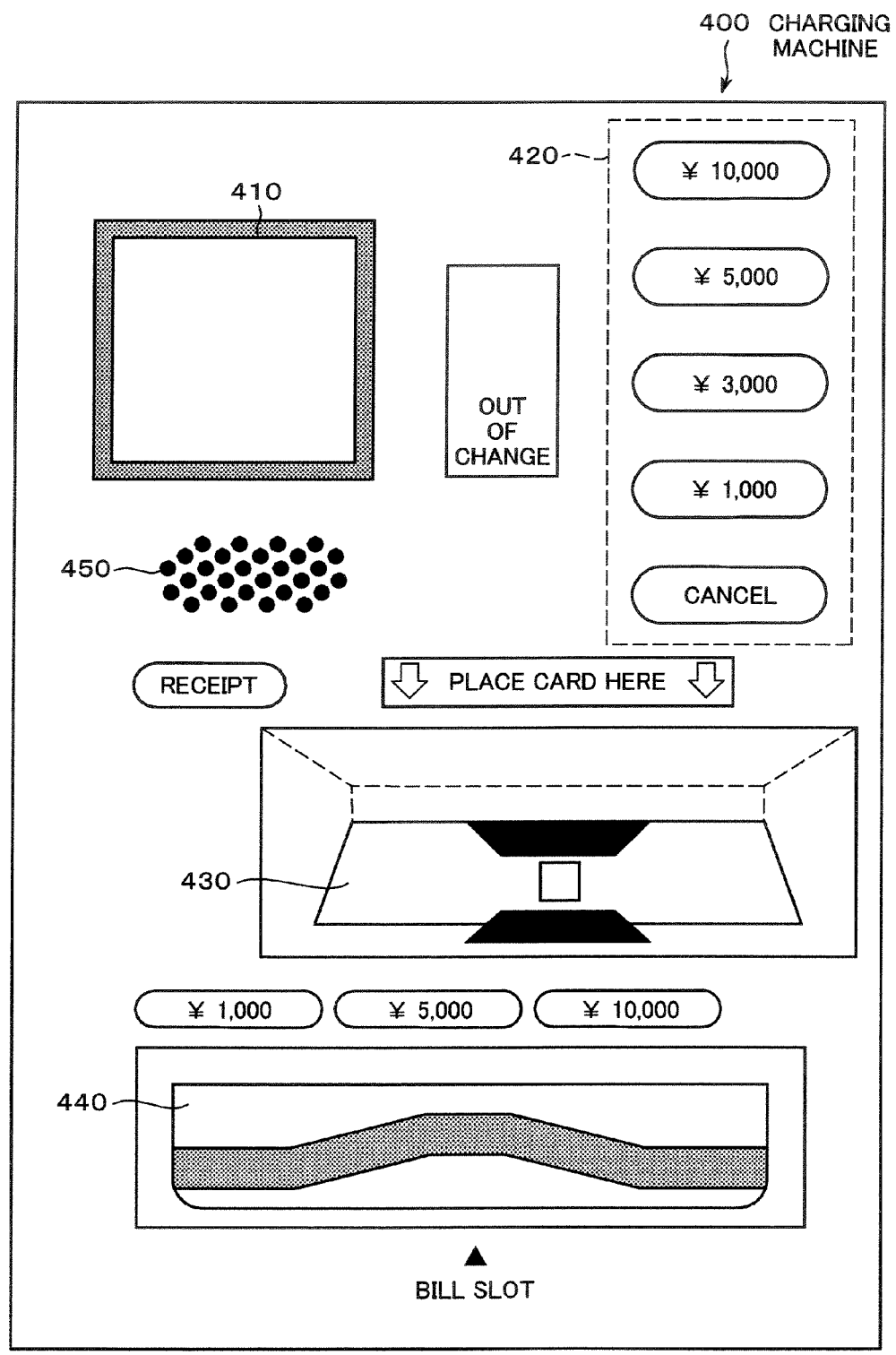
FIG. 2 is a schematic diagram showing a structure of a front panel portion of a conventional electronic money charging machine.
Figure 4:
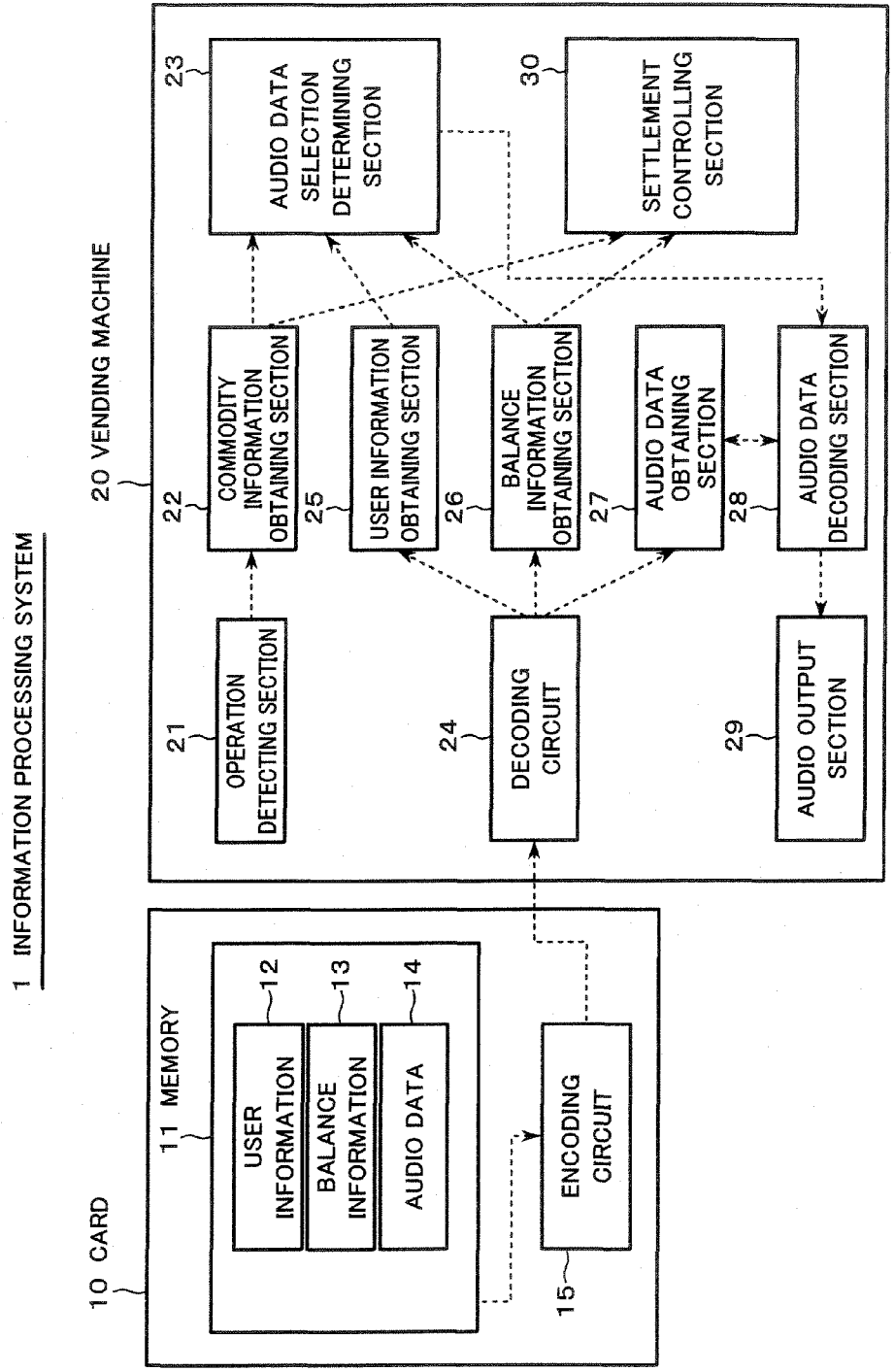
FIG. 4 is a block diagram showing an example of a structure of an information processing system according to a first embodiment of the present invention.

An information processing system 1 shown in FIG. 4 is a system made up of a card 10 and a vending machine 20. Although the basic structure of the card 10 is the same as that of the card 300 shown in FIG. 1, FIG. 4 shows only structural elements largely related to the present invention. In this embodiment, user information 12, balance information 13, and audio data 14 have been recorded in a memory 11 (corresponding to the EEPROM 314 shown in FIG. 1).

The user information 12 contains ID information with which the user of the card is identified or ID information unique to the card. The balance information 13 contains information representing the balance of electronic money of the card. The audio data 14 contains one or a plurality of items of effect sound data. The effect sound data have been recorded in the card 10 by its user. The user of the card 10 can download effect sound data from a terminal unit, which vends the card 10, a personal computer, or the like. The user can select his or her desired effect sound from those of a download site or the like disposed on a network such as the Internet and download the selected effect sound therefrom. Effect sounds include any types of sounds such as music and voice.

When the user buys the card 10, he or she may be caused to select at least one of items of effect sound data (with a card vending terminal or the like) and to store the selected effect sound data in the card 10.

It is expected that the audio data 14 recorded in the memory 11 of the card 10 are dynamically transferred to the vending machine 20 through an encoding circuit 15 and quickly reproduced on the vending machine 20 side when the user buys a commodity with the card 10. This, it is preferred that the size of the effect sound data be as small as possible. If the size of the effect sound data is large, it may take a time until an effect sound is reproduced. Thus, the effect sound may not be reproduced at a proper timing. Thus, as the audio data 14, it is thought that the audio data 14 are data according to for example a digital interface standard such as MIDI (Musical Instrument Digital Interface), a digital audio converting standard such as ADPCM (Adaptive Differential Pulse Code Modulation), or an audio compressing standard used in MPEG-4 (Moving Picture Experts Group phase 4) or MPEG-2 (Moving Picture Experts Group phase 2) such as AAC (Advanced Audio Coding). Thus, the audio data 14 contain sound data such as voice data, audio data, and cue data. Instead, the audio data 14 may contain audio data with which a part or whole of music is reproduced.

The encoding circuit 15 corresponds to the encoding circuit 318 of the interface 316 of the card 300 shown in FIG. 1. The encoding circuit 15 converts the user information 12, the balance information 13, and the audio data 14 into transmission codes and transmits the converted codes to the vending machine 20.

The vending machine 20 is made up of an operation detecting section 21, a commodity information obtaining section 22, an audio data selection determining section 23, a decoding circuit 24, a user information obtaining section 25, a balance information obtaining section 26, an audio data obtaining section 27, an audio data decoding section 28, an audio output section 29, and a settlement controlling section 30.

The operation detecting section 21 detects a button operation and so forth that the user who tries to buy a commodity from the vending machine 20 has performed to select the commodity. When the user has performed the button operation, the operation detecting section 21 transmits information about the selected commodity to the commodity information obtaining section 22.

When the commodity information obtaining section 22 has obtained information about the commodity that the user has selected from the operation detecting section 21, the commodity information obtaining section 22 obtains the sales price of the commodity from a predetermined file or the like. Instead, the sales price may be transmitted from the operation detecting section 21.

The decoding circuit 24 reads from the card 10 the user information 12, the balance information 13, and the audio data 14 that have been encoded by the encoding circuit 15 of the card 10. Thereafter, the decoding circuit 24 decodes the user information 12, the balance information 13, and the audio data 14 and transmits the decoded information to the user information obtaining section 25, the balance information obtaining section 26, and the audio data obtaining section 27, respectively.

The audio data selection determining section 23 selects effect sound data to be reproduced on the basis of the information about the commodity obtained by the commodity information obtaining section 22, the sales price thereof, the user information 12 obtained by the user information obtaining section 25, the balance information 13 obtained by the balance information obtaining section 26, and the audio data 14 obtained by the audio data obtaining section 27.

The audio data decoding section 28 obtains identification information of the selected audio data from the audio data selection determining section 23 and obtains the identified effect sound data from the audio data obtaining section 27. It is thought that there are several methods of identifying one item of effect sound data from the audio data 14 obtained by the audio data obtaining section 27.

Figure 5:
FIG. 5 is a schematic diagram showing an example of audio data recorded in a card of the information processing system according to the first embodiment of the present invention.

With reference to FIG. 5, one example of these methods will be described. FIG. 5 shows the contents of the audio data 14 stored in the card 10. The audio data 14 are formed to contain a plurality of items of effect sound data and unique identification numbers correlated therewith. For example, effect sound data 1 are correlated with identification number 0001. Effect sound data 2 are correlated with identification number 0002. The audio data obtaining section 27 obtains the contents of the audio data 14 from the card 10 and holds it. On the other hand, the audio data selection determining section 23 of the vending machine 20 selects effect sound data by deciding the identification number on the basis of the information about, sales price of, and so forth of the commodity to be reproduced, obtained by the commodity information obtaining section 22. Thereafter, the audio data decoding section 28 obtains the identification number as identification information from the audio data selection determining section 23, obtains effect sound data corresponding to the identification number from the audio data obtaining section 27, and decodes the effect sound data to be reproduced.

When such a method is used, each identification number can be assigned a unique meaning. For example, if the audio data selection determining section 23 of the vending machine 20 selects identification number 0001 in the case that the settlement has been successfully made and identification number 0002 in the case that the settlement has not been successfully made, when the user of the card 10 downloads an effect sound reproduced in the case that the settlement has been successfully made and assigns the effect sound to identification number 0001 and an effect sound reproduced in the case that the settlement has not been successfully made to identification number 0002, the vending machine 20 can be caused to reproduce desired effect sounds that user has set up according to the result of the settlement of electronic money.

Since each user of the card 10 can freely set up effect sounds (namely, he or she can freely select effect sounds and assign them to identification numbers), effect sounds may differ for each user of the card 10. Like the download operation of effect sounds, each user can set up effect sounds with a terminal unit that vends the card 10, a personal computer, or the like.

In the example shown in FIG. 5, each item of effect sound data is assigned a unique identification number. Instead, effect sound data may be identified by only record positions without a record area for identification numbers. For example, effect sound data at the first position of the memory 11 of the card 10 can be distinguished from effect sound data at the next position (entry).

When it is not necessary to reproduce predetermined effect sounds according to predetermined conditions, at least different effect sounds may be reproduced according to conditions. Identification information is generated so that when the settlement has been successfully made, the audio data selection determining section 23 of the vending machine 20 selects effect sound data of a predetermined entry of the audio data 14 obtained by the audio data obtaining section 27 and when the settlement has not been successfully made, the audio data selection determining section 23 selects effect sound data of other than the predetermined entry of the audio data 14.

In addition, the audio data selection determining section 23 of the vending machine 20 can be controlled to randomly select effect sound data from the audio data 14 obtained by the audio data obtaining section 27. In addition, when a predetermined condition is satisfied, effect sound data may be randomly selected from effect sound data of a predetermined group (according to a condition) of the audio data 14. These effect sounds may be generated at any timing.

As the simplest structure of the information processing system 1, one item of effect sound data stored in the card 10 may be directly reproduced by the vending machine 20. This structure allows an effect sound to differ for each user of cards 10. Thus, even if many vending machines 20 are installed nearby, each user can distinguish his or hear effect sound from others. In this case, it is necessary for the audio data selection determining section 23 of the vending machine 20 to have at least information about the timing at which an effect sound is generated.

When an effect sound is generated corresponding to a predetermined operation, it is necessary to obtain a notification of the operation from the operation detecting section 21. When effect sounds are generated depending on whether the settlement has been successfully made or not successfully made due to the insufficient balance, it is necessary to obtain the prices information of the commodity from the commodity information obtaining section 22 and the balance information of the card 10 from the balance information obtaining section 26.

Returning to the description for the structural elements of the vending machine 20, the effect sound data decoded by the audio data decoding section 28 are transmitted to the audio output section 29 such as a speaker. The audio output section 29 outputs the effect sound data.

In addition, the vending machine 20 has the settlement controlling section 30. The settlement controlling section 30 determines whether the settlement has been successfully made on the basis of the information about a commodity to be bought, obtained by the commodity information obtaining section 22, a sales price thereof, the and the balance information 13 obtained by the balance information obtaining section 26. In other words, when the balance information represents the amount of money that is equal to or greater than the sales price of the selected commodity, the transaction is conducted and the settlement is made.

When the settlement controlling section 30 has determined that the settlement has been successfully made, the settlement controlling section 30 controls the vending machine 20 to display a predetermined indication and convey the commodity to the commodity slot. In contrast, when the settlement controlling section 30 has determined that the settlement has not been successfully made, the settlement controlling section 30 controls the vending machine 20 to display a predetermined error indication. In addition, when the settlement has been successfully made, the settlement controlling section 30 controls the vending machine 20 to rewrite the balance information 13 of the card 10 (specifically, the balance is updated by a predetermined encoding circuit and a decoding circuit (not shown)). These functions of the settlement controlling section 30 are the same as those of conventional vending machines. In other embodiments of the present invention, the description of functions corresponding to the settlement controlling section 30 will be omitted.

In this example, the vending machine 20 (so-called automatic vending machine) from which a commodity can be bought with electronic money is described. However, the structures of machines that provide particular services such as an automatic massage machine are the same as the structure of the vending machine 20. In these machines, when the settlement has been successfully made, the settlement controlling section 30 causes each structural element of the machine to perform a predetermined operation for a predetermined service.

In the first embodiment of the present invention, the vending machine 20 reproduces audio data (effect sound data). However, the present invention is not limited to this example. In other words, the present invention may be applied to a structure that reproduces image data instead of or in addition to audio data. In this case, image data contain still picture data according to JPEG (Joint Photographic Experts Group) or GIF (Graphic Interchange Format) and moving picture data according to for example MPEG-4 or MPEG-2. These data are recorded in the memory 11 of the card 10. On the other hand, the vending machine 20 also has an image display section composed of an LCD (Liquid Crystal Display) or the like. The audio data decoding section 28 decodes image data obtained by the audio data obtaining section 27 into a displayable format and transmits the decoded image data to the image display section.

The image display section may be simply composed of only a plurality of LEDs (Light Emitting Diodes). In this case, it is thought that image data recorded in the memory 11 of the card 10 are simple bit data, for example, positions of LEDs that are blinked, blink start timings, and blinking durations.

In this structure, the user of the information processing system 1 according to the present invention can know the result of the settlement of electronic money not only by effect sounds, but by images. This structure is very effective for an aged user and a hearing handicapped user.

In other embodiments of the present invention, for convenience, only audio data will be handled. However, as described above, like audio data, image data can be also handled. Thus, it should be noted that the present invention is not related to only audio data.

Figure 6:
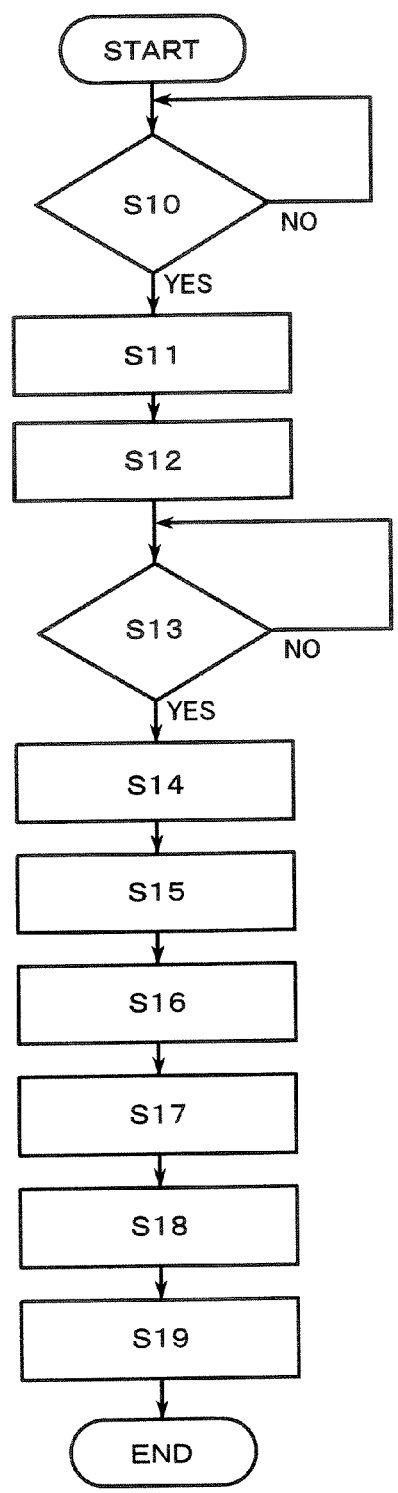
FIG. 6 is a flow chart showing an operation of the information processing system according to the first embodiment of the present invention.

Next, with reference to a flow chart shown in FIG. 6, an operation of the vending machine 20 will be described. In the operation of the vending machine 20, a plurality of items of effect sound data have been recorded as the audio data 14 in the card 10. The vending machine 20 determines at least whether a settlement has been successfully made or not successfully made (due to insufficient balance). Depending on these cases, the vending machine 20 generates different effect sounds of the audio data 14.

At first step S10, it is determined whether the user has operated the vending machine 20. When the user has not operated the vending machine 20 (No at step S10), the determination of step S10 is repeated at intervals of a predetermined time period until the user has operated the vending machine 20. When the determined result denotes that the user has operated the vending machine 20 (Yes at step S10), the audio data selection determining section 23 obtains information about a commodity that the user has selected from the commodity information obtaining section 22 (at step S11). The commodity information obtaining section 22 outputs these information on the basis of information received from the operation detecting section 21.

Figure 3:
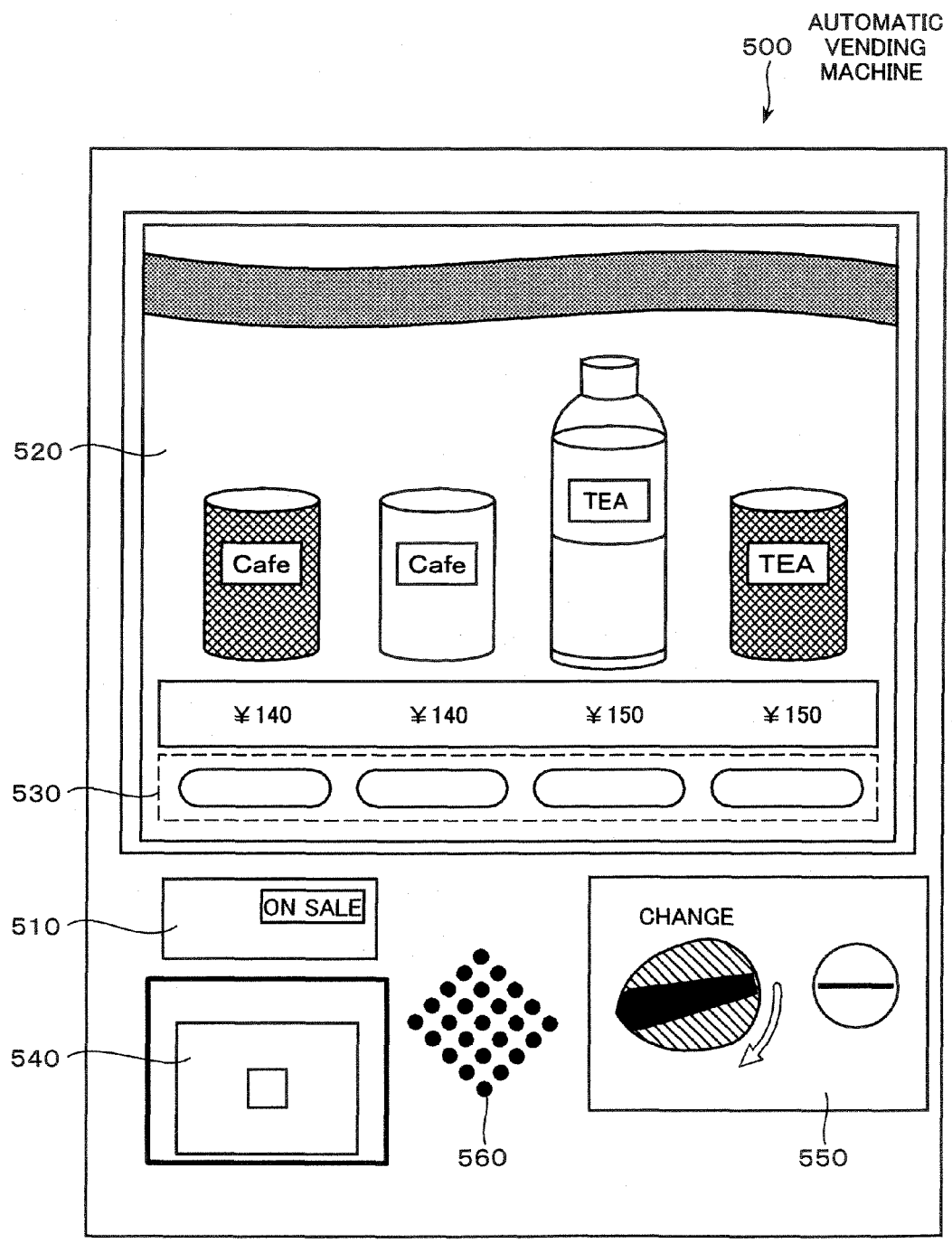
FIG. 3 is a schematic diagram showing a structure of a front panel portion of a conventional automatic vending machine from which a user can buy a commodity with electronic money.

Thereafter, the flow advances to step S12. At step S12, the user is prompted to make a settlement of electronic money. This operation is performed by either or both of an effect sound and an image that the vending machine 20 side provides. For example, "Present the card here" is announced or displayed. Thereafter, the flow advances to step S13. At step S13, it is determined whether the user has presented the card to the vending machine 20. The card is presented for example by touching a card information detecting section (not shown) with the card or gradually passing the card therethrough. The card information detecting section is similar to the card information detecting section 540 of the automatic vending machine 500 shown in FIG. 3. When the user has not presented the card to the vending machine 20 (No at step S13), the determination of step S13 is repeated at intervals of a predetermined time period until the user has presented the card. When the user has presented the card (Yes at step S13), the flow advances to step S14. At step S14, the decoding circuit 24 decodes various types of information transmitted from the card.

Thereafter, the flow advances to step S15. At step S15, the audio data selection determining section 23 obtains the user information 12 and the balance information 13 from the decoded data. At this point, the audio data selection determining section 23 has obtained the commodity information about the commodity that the user has selected (that the user tries to buy) and the user information 12 and the balance information 13 of the card 10. Thereafter, at step S16, the audio data selection determining section 23 determines an effect sound to be reproduced on the basis of each of the foregoing information and transmits identification information to the audio data decoding section 28. Specifically, when the sales price of the selected commodity is lower than the balance of the card 10, it is determined that the settlement has been successfully made. In this case, an identification number (for example, 0001) corresponding an effect sound that represents the determined result is output as identification information. In contrast, when the sales price of the selected commodity is greater than the balance of the card 10 (insufficient balance), it is determined that the settlement has not been successfully made. In this case, an identification number (for example, 0002) corresponding to an effect sound that represents the determined result is output as identification information.

Thereafter, at step S17, the audio data decoding section 28 identifies an effect sound to be reproduced from the audio data 14 obtained from the audio data obtaining section 27 on the basis of the identification information received from the audio data selection determining section 23. At step S18, the audio data decoding section 28 decodes the effect sound data to be reproduced. Thereafter, at step S19, the decoded data are transmitted to the audio output section 29. The audio output section 29 outputs the effect sound.

In the foregoing example of the first embodiment of the present invention, data are exchanged between the card 10 and the vending machine 20. However, it is not necessary to limit the information processing system according to the present invention to a vending machine that provides a commodity and a service. Aside from such a vending machine, this system may be applied to various types of machines that make settlements of electronic money, such as an electronic money charging machine, a cash register used in a store, and an automatic ticket gate machine. For an electronic money charging machine, such a process may be performed between the card 10 and the electronic money charging machine. The charging process of electronic money can be considered as the same process as an settlement process of a commodity bought from a vending machine because electronic money is bought in cash.

Specifically, the charging machine obtains the audio data 14 from the card 10. When the settlement has been successfully made, for example the amount of money that the user has designated as deposit money matches the amount of a bill that he or she has inserted, a predetermined effect sound of the audio data 14 is output from the speaker of the charging machine. In addition, the balance information 13 of electronic money of the card 10 is rewritten. When the settlement has not been successfully made, for example, the amount of money that the user has designated as the deposit money exceeds the maximum amount of money that the charging machine can accept or the amount of money that the user has designated as the deposit money does not match the amount of a bill that he or she has inserted, the predetermined effect sound or another effect sound that is different therefrom is output from the speaker.

Aside from a vending machine and a charging machine, as long as an information apparatus can access a card that can make a settlement of electronic money and references or updates the contents recorded in the card, the information apparatus may become a structural element of the information processing system according to the present invention. In addition, according to the present invention, it is not necessary that the present invention is based on the use of electronic money or the settlement function of electronic money. In the information processing system according to the present invention, predetermined information is read from an information record medium having any structure. An effect sound and so forth are output according to an operation for the information record medium. The output effect sound differs for each information record medium.

Thus, the foregoing card is not limited to a contactless IC card. In other words, the foregoing card may be an information record medium having any structure that can store predetermined data and that can communicate data with a vending machine and so forth. For example, an information record medium may be a mobile phone or a portable device having a communication function such as Bluetooth (registered trademark).

Next, with reference to FIG. 7, FIG. 8A, and FIG. 8B, an information processing system according to a second embodiment of the present invention will be described. In an information processing system 50 shown in FIG. 7, a card 60 does not have audio data. Instead, a vending machine 70 side has audio data. An audio data recording section 77 of the vending machine 70 stores a plurality of items of effect sound data. As shown in FIG. 8A, the audio data recording section 77 stores a plurality of items of effect sound data (effect sound data 1 to effect sound data 10), for example, corresponding to identification IDs.

To generate an effect sound, an audio data selection determining section 73 of the vending machine 70 obtains an identification ID that is unique to the user of the card 60 (or that identifies the card 60) from the user information obtaining section 75. The identification ID is provided to an audio data decoding section 78. As a result, the audio data decoding section 78 retrieves effect sound data corresponding to the identification ID from the audio data recording section 77. In the case that the contents of the audio data recording section 77 are formed as shown in FIG. 8A, when the audio data selection determining section 73 provides identification ID 0003 to the audio data decoding section 78, it selects effect sound data 3 corresponding to identification ID 0003, decodes effect sound data 3 to be reproduced, and sends the decoded effect sound data to an audio output section 79.

A part of an identification ID, for example, two low-order digits of a four digit number of an identification ID, identifies effect sound data. For example, the two high-order digits of the identification ID identify an organization code, whereas the two low-order digits identify a personal code. In this structure, although the same effect sound may be generated for a plurality of users (the cards 60), the same effect sound is not generated for users in the same department. As a result, the amount of effect sound data stored in the vending machine 70 can be decreased.

In this structure, even if the card 60 does not have audio data, the vending machine 70 can be controlled so that an effect sound that differs for each user of the card 60 is generated. As described above, since the communication bandwidth between the card 60 and the vending machine 70 is not large, it can be said that the structure that does not exchange audio data therebetween is preferable. In addition, since the vending machine 70 side that reproduces effect sounds has effect sound data, effect sound data that have a relatively large size can be easily reproduced.

Instead, the contents of the audio data recording section 77 may be formed as shown in FIG. 8B. In this example, effect sound data are set for each identification ID and each identification number. Like the foregoing case, the audio data selection determining section 73 obtains an identification ID from a user information obtaining section 75. In addition, the audio data selection determining section 73 sets identification numbers to effect sounds so that different effect sounds are generated depending on the result of a settlement of electronic money and transmits the obtained identification ID and the identification number to the audio data decoding section 78. As a result, the audio data decoding section 78 retrieves effect sound data corresponding to the identification ID and identification number, which have been received from the audio data selection determining section 73, from the audio data recording section 77. If the contents of the audio data recording section 77 are formed, for example, as shown in FIG. 8B, when the audio data decoding section 78 has received identification ID 0002 and identification number 0002 as identification information from the audio data selection determining section 73, the audio data decoding section 78 selects effect sound data 2B corresponding to the identification information, decodes them, and sends the decoded data to the audio output section 79.

This structure allows an effect sound that differs for each user of the card 60 to be used. In addition, this structure allows an effect sound that differs for each cause to be used for the same user.

The contents of the audio data recording section 77 shown in FIG. 8A and FIG. 8B are just examples. In other words, the contents of the audio data recording section 77 may be formed in various manners. In addition, when the vending machine 70 can be connected to a network such as the Internet, audio data having the same contents can be distributed to a plurality of vending machines 70. In this example, it is assumed that effect sounds of the audio data recording section 77 are effect sounds that can be freely set by a third party other than the user of the card 60. However, each user of the card 60 can select audio data and set an identification number to the selected audio data, for example, with a charging machine or a personal computer connected to the network.

Next, with reference to FIG. 9 and FIG. 10, an information processing system according to a third embodiment will be described. In an information processing system 100 shown in FIG. 9, audio data are recorded both on a card 110 and in a vending machine 120. In other words, audio data 114 are recorded in a memory 111 of the card 110. In addition, audio data are recorded in an audio data recording section 130 of the vending machine 120.

It is assumed that the audio data 114 on the card 110 are effect sound data set by the user, whereas effect sound data in the audio data recording section 130 of the vending machine 120 are effect sounds freely set by other than the user of the card 110. In addition, it is assumed that there may be the case that each item of effect sound data has not been set, namely there are no effect sound data. When the card 110 has the audio data 114, the information processing system 100 preferentially uses effect sound data of the audio data 114 as an effect sound. In contrast, when the card 110 does not have the audio data 114, the information processing system 100 uses effect sound data that have been recorded in the audio data recording section 130 of the vending machine 120.

The structure of the information processing system 100 is basically the same as that of the information processing system 1 shown in FIG. 4 except that an audio data decoding section 128 obtains effect sound data not only from an audio data obtaining section 127 but from the audio data recording section 130.

Next, with reference to a flow chart shown in FIG. 10, an operation of the information processing system 100 will be described. In this example, it is assumed that the audio data 114 in the card 110 are audio data as shown in FIG. 5, whereas audio data recorded in the audio data recording section 130 of the vending machine 120 are audio data as shown in FIG. 8B.

At first step S20, it is determined whether the user has operated the vending machine 120. When the user has not operated the vending machine 120 (No at step S20), the determination of step S20 is repeated at intervals of a predetermined time period until the user has operated the vending machine 120. When the determined result denotes that the user has operated the vending machine 120 (Yes at step S20), the audio data selection determining section 123 obtains information about a commodity that the user has selected from the commodity information obtaining section 122 (at step S21). The commodity information obtaining section 122 outputs these information on the basis of information and so forth received from the operation detecting section 121.

Thereafter, the flow advances to step S22. At step S22, the user is prompted to make a settlement of electronic money. This operation is performed with either or both an effect sound and an image provided on the vending machine 120 side. For example, "Present the card here." is announced or displayed. Thereafter, at step S23, it is determined whether the user has presented the card to the vending machine 120. When the user has not presented the card to the vending machine 120 (No at step S23), the determination of step S23 is repeated at intervals of a predetermined time period until the user has presented the card to the vending machine 120. When the user has presented the card to the vending machine 120 (Yes at step S23), the flow advances to step S24. At step S24, the decoding circuit 124 decodes information transmitted from the card.

Thereafter, at step S25, the audio data selection determining section 123 obtains the user information 112 and the balance information 113 from the decoded data. At this point, the audio data selection determining section 123 has obtained commodity information about a commodity that the user has selected (tires to buy), the user information 112, and the balance information of the card 110. At step S26, the audio data selection determining section 123 determines an effect sound to be reproduced on the basis of those information and transmits identification information to the audio data decoding section 128.

In this case, identification information is an identification ID obtained from the user information 112 and an identification number assigned to an effect sound to be reproduced. For example, when the sales prices of the commodity that the user has selected is lower than the balance of the card 110, it is determined that the settlement has been successfully made and outputs an identification number (for example, 0001) and an identification ID corresponding to an effect sound that represents the result of the settlement as identification information. In contrast, when the sales price of the commodity that the user has selected is greater than the balance of the card 110 (namely, in the case of insufficient balance) or when an error has occurred due to a read error of the card 110, it is determined that the settlement has not been successfully made and outputs an identification number (for example, 0002) and an identification ID corresponding to an effect sound that represents the result of the settlement as identification information.

Thereafter, at step S27, it is determined whether the audio data obtaining section 127 has obtained the audio data 114 of the card 110. When the audio data 114 have been obtained (Yes at step S27), the audio data decoding section 128 identifies an effect sound to be reproduced from the audio data 114 obtained from the audio data obtaining section 127 on the basis of the identification number received from the audio data selection determining section 123 and obtains the effect sound data (at step S28). In contrast, when the audio data 114 have not been obtained (No at step S27), the audio data decoding section 128 identifies an effect sound to be reproduced from audio data recorded in the audio data recording section 130 on the basis of the identification information (an identification ID and an identification number) received from the audio data selection determining section 123 and obtains the effect sound data (at step S29).

When the audio data 114 have not been obtained, since the user of the card 110 had not downloaded the audio data 114, the card 110 does not have the audio data 114. In this case, an effect sound recorded in the vending machine 120 is used. In this example, an effect sound that differs for each identification ID and for each identification number is provided in the vending machine 120. If the audio data 114 have not been recorded in the card 110 as an exceptional case, it is possible to record one type of or at most several types of effect sounds in the vending machine 120.

The effect sound data obtained at step S28 or step S29 are decoded and reproduced at step S30. Thereafter, at step S31, the decoded data are transmitted to the audio output section 129. The audio output section 129 outputs the effect sound.

In this structure, when a settlement of electronic money is made, an effect sound that has been set by the user of the card 110 is output. When an effect sound has not been set by the user, an effect sound provided in the vending machine 120 is output.

Next, an information processing system according to a fourth embodiment of the present invention will be described. An information processing system 150 according to the fourth embodiment is a modification of the information processing systems according to the second embodiment and the third embodiment. Thus, the information processing system 150 can be applied to the information processing systems according to the second embodiment and the third embodiment. However, for convenience, an example of which the information processing system 100 according to the third embodiment is modified will be described with reference to FIG. 11 and FIG. 12.

Figure 9:
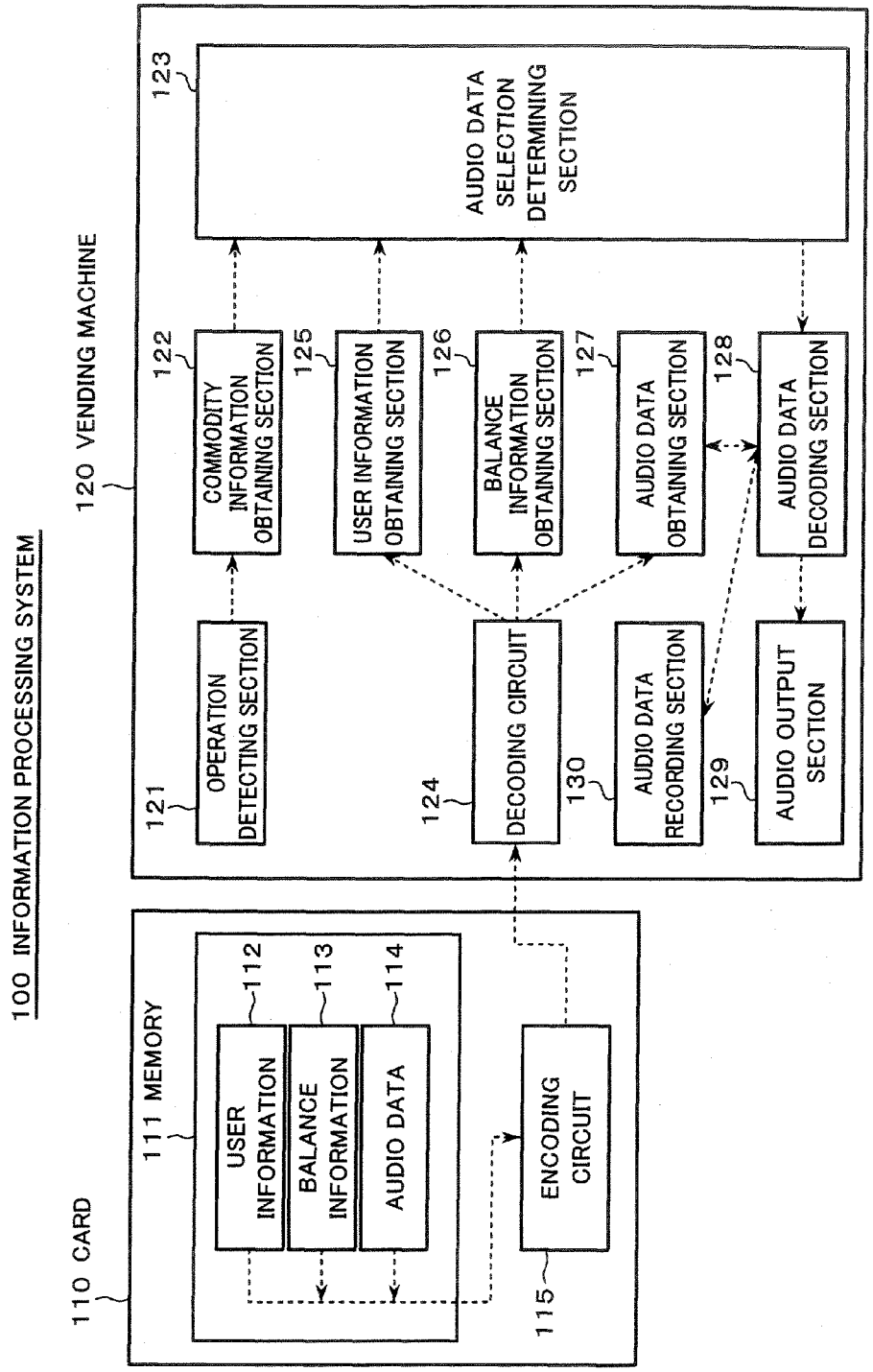
FIG. 9 is a block diagram showing an example of a structure of an information processing system according to a third embodiment of the present invention.
Figure 10:
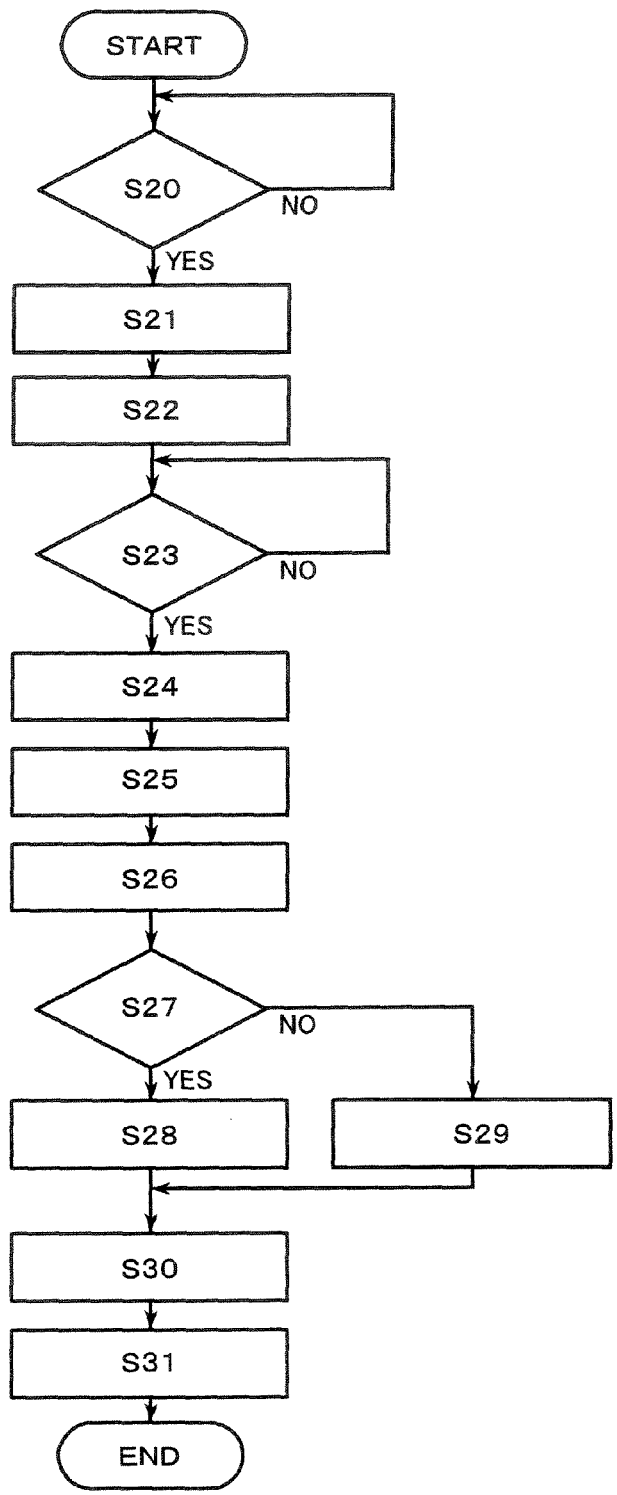
FIG. 10 is a flow chart showing an operation of the information processing system according to the third embodiment of the present invention.

In the information processing system 150 shown in FIG. 11, a card 160 has the same structure as the card 110 of the information processing system 100 shown in FIG. 9 except that the card 160 has as user information 162 information about a user of the card 160, namely information such as age, sex, and birth date of the user aside from an identification ID. On the other hand, a vending machine 170 also has an environmental information obtaining section 181 in comparison with the structure of the vending machine 120 of the information processing system 100. The environmental information obtaining section 181 provides new information to an audio data selection determining section 173.

The environmental information obtaining section 181 provides environmental information to the audio data selection determining section 173. The environmental information includes, for example, the today's date, current time, current season, installed place of the vending machine 170, and information such as temperature, humidity, wind speed, and rainfall in the installed place of the vending machine 170. Thus, the environmental information obtaining section 181 has a clock circuit that obtains information of date, time, season, and so forth, a recording means in which the installed place of the vending machine 170 is pre-recorded, a GPS (Global Positioning System) circuit that dynamically measures the position of the vending machine 170, a thermometer and a humidity meter that respectively measure ambient temperature and humidity of the installed place of the vending machine 170, and so forth. Instead, the environmental information obtaining section 181 may obtain such information from an external agency or the like through the network without such measuring devices.

In the information processing system 150, the audio data selection determining section 173 operates to select a predetermined effect sound when a predetermined condition is satisfied. The audio data selection determining section 173 has been set so that it reproduces a predetermined effect sound in a normal state. In the examples of the information processing systems according to the second and third embodiments, they have been set so that different effect sounds are output depending on whether a settlement has been successfully made.

However, in this example, effect sounds are selected according to conditions composed of much more information including data supplied from the environmental information obtaining section 181. Examples of selected effect sounds are shown in FIG. 12.

In condition 1 shown in FIG. 12, when balance information denotes that the balance of electronic money is equal to or lower than a predetermined amount of money, music having a melody that causes the user to feel anxiety such as a theme song of a horror movie is selected as an effect sound. When the date on which a settlement of electronic money is made is the birthday of the user of the card 160, music that celebrates the birthday is selected as an effect sound.

According to the third embodiment, when the card 160 side has audio data 164, they are preferentially used. However, when a condition as shown in FIG. 12 is satisfied, an effect sound corresponding to the condition may be preferentially retrieved from a audio data recording section 180 of the vending machine 170 and the retrieved effect sound may be used.

When two conditions are simultaneously satisfied, one effect sound can be decided according to a predetermined priority order of those that have been set for each condition (a number described in field "priority" in FIG. 12). If a user who is younger than 20 years old tries to buy a commodity whose price is 30,000 yen or higher in a theme park, condition 3 and condition 4 shown in FIG. 12 are simultaneously satisfied. In addition, the priority order of condition 3 is 3, whereas the priority order of condition 4 is 2. In this case, it is assumed that condition 4 is satisfied and an effect sound, which is an alarm message, corresponding to condition 4 whose priority order is higher than condition 3 (namely, the number of field "priority" shown in FIG. 12 of condition 4 is smaller than that of condition 3) is selected and output.

In this structure, even if the user has not recorded the audio data 164 to the card 160, since various effect sounds are generated according to predetermined conditions, he or she can have a fresh impression while he or she is ordinarily operating electronic money. In addition, an effect sound that causes the user to draw attention to his or her operation is generated in predetermined conditions.

In addition, music selected in such a manner is identified by a predetermined identification number in the audio data recording section 180 like the foregoing manner.

Next, an information processing system according to a fifth embodiment of the present invention will be described. An information processing system 200 according to the fifth embodiment is a modification of the information processing system 150 according to the fourth embodiment. Next, with reference to FIG. 13 and FIG. 14, the information processing system 200 will be described.

Figure 13:
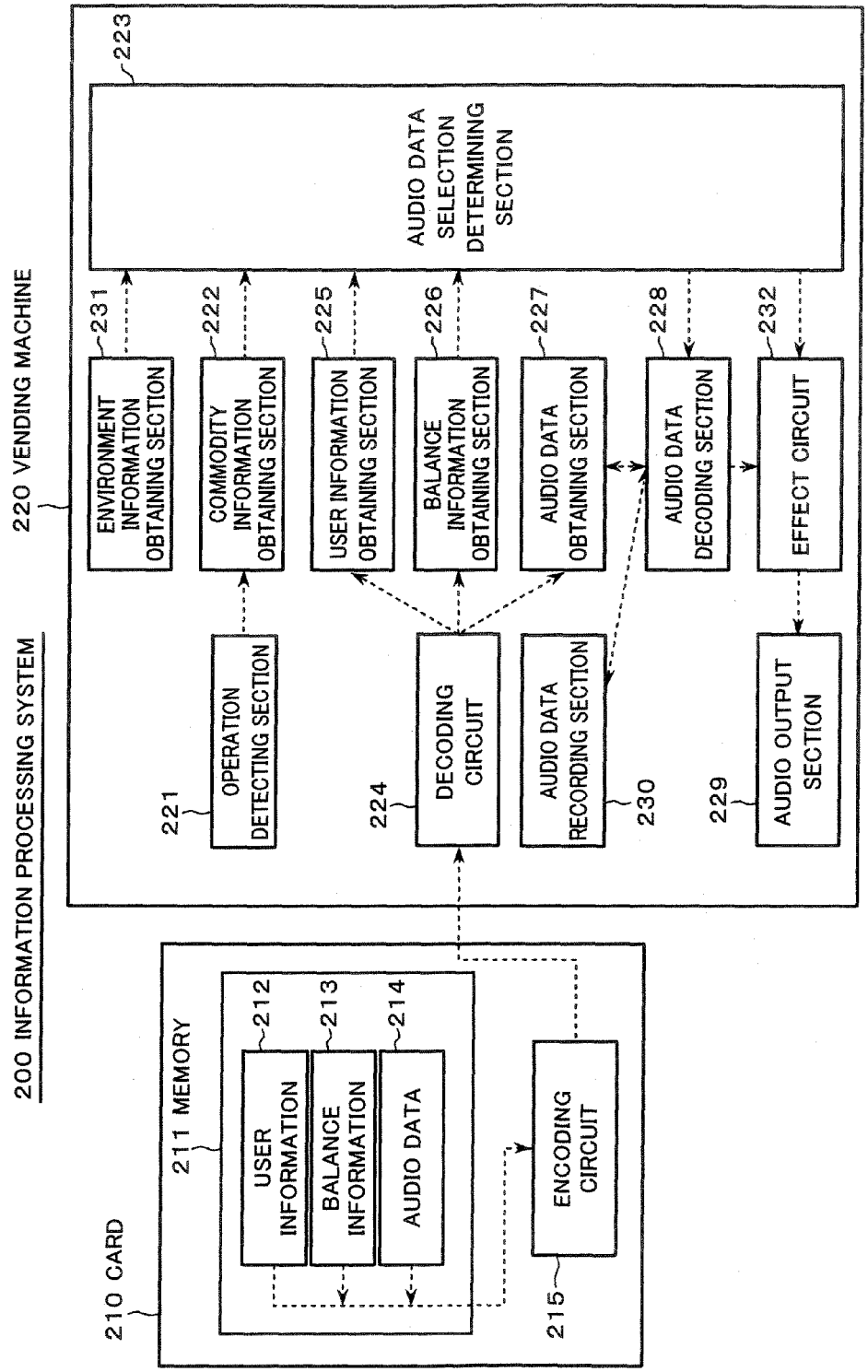
FIG. 13 is a block diagram showing an example of a structure of an information processing system according to a fifth embodiment of the present invention.

In the information processing system 200 shown in FIG. 13, a card 210 has the same structure as the card 160 of the information processing system 150 shown in FIG. 11. A vending machine 220 has a structure different from the vending machine 170 of the information processing system 150 in that an effect circuit 232 is added between an audio data decoding section 228 and an audio output section 229.

The effect circuit 232 includes a circuit that compensates audio data, such as an audio quality compensation—gain compensation circuit (namely, a circuit that processes and/or transforms audio data). The effect circuit 232 compensates effect sound data that are output from an audio data decoding section 228 according to a compensation command received from an audio data selection determining section 223 and supplies the compensated effect sound data to an audio output section 229. The effect circuit 232 changes for example the sound quality, sound volume, and so forth of the effect sound without selecting the effect sound. Thus, while music, message, and so forth that compose the effect sound are maintained, tone and volume of the sound are changed.

Predetermined conditions determined by the audio data selection determining section 223 and contents of compensations corresponding thereto are for example as shown in FIG. 14. In condition 1, if the user is 80 years old or older, the selected effect sound is compensated so that the tempo is slowed down, the sound volume is increased, and the high pitch sound is emphasized. In condition 2, if the balance of electronic money is equal to or lower than a predetermined amount of money, the selected effect sound is compensated so that the tempo is speeded up, the sound volume is increased, and the effect sound is emphasized, notifying the user that a serious situation is taking place.

In such a manner, the audio data selection determining section 223 obtains necessary information from a user information obtaining section 225, an environment information obtaining section 231, and so forth and determines whether these information matches the conditions shown in FIG. 14. When the these information matches one of the conditions, the audio data selection determining section 223 commands the effect circuit 232 to compensate the effect sound according to the condition. In addition, identification information of the selected effect sound is transmitted to the audio data decoding section 228. The effect circuit 232 receives effect sound data of the selected effect sound from the audio data decoding section 228 and compensates the effect sound data as commanded.

Like in condition 4 and condition 5, when necessary, an image may be displayed or image data may be compensated. As described above, according to the embodiments of the present invention, image data can be handled in the same manner as audio data. In addition, like the fourth embodiment, when a plurality of conditions are satisfied, a compensation is performed according to a priority order. For example, when condition 1 and condition 5 are simultaneously satisfied, a compensation corresponding to condition 5 whose priority order is higher than that of condition 1 (namely, the number of field "priority" shown in FIG. 14 of condition 5 is smaller than that of condition 1) is preferentially performed. In addition, when two conditions are simultaneously satisfied, compensations corresponding to these conditions can be performed. For example, when condition 1 and condition 5 are simultaneously satisfied, the tempo of the selected effect sound is slowed down, the sound volume is increased, and the high pitch tone is emphasized. In addition, a corresponding message is displayed.

In this example, unlike the fourth embodiment, an effect sound is not selected. However, in combination of the fourth embodiment and the fifth embodiment, when a predetermined condition is satisfied, a predetermined effect sound may be selected and a predetermined modification may be performed for the selected effect sound.

When the vending machines according to the first embodiment to fifth embodiment are connected to the network, network type electronic money can be used to make settlements. In this case, user information such as an identification ID is sent to an electronic money settlement server or the like disposed on the network. The electronic money settlement server makes settlements.

The card that has been described as a structural element of the forgoing information processing systems may not have a card shape. Instead, the card may be an information record medium having any structure. For example, the information record medium may be structured by incorporating a wireless IC tag in a portable device such as a mobile phone. In this case, it is thought that a wireless IC tag is incorporated independent from existing structural elements of a mobile phone or a wireless IC tag is incorporated in common with a part of existing structural elements of a mobile phone.

Figure 15:
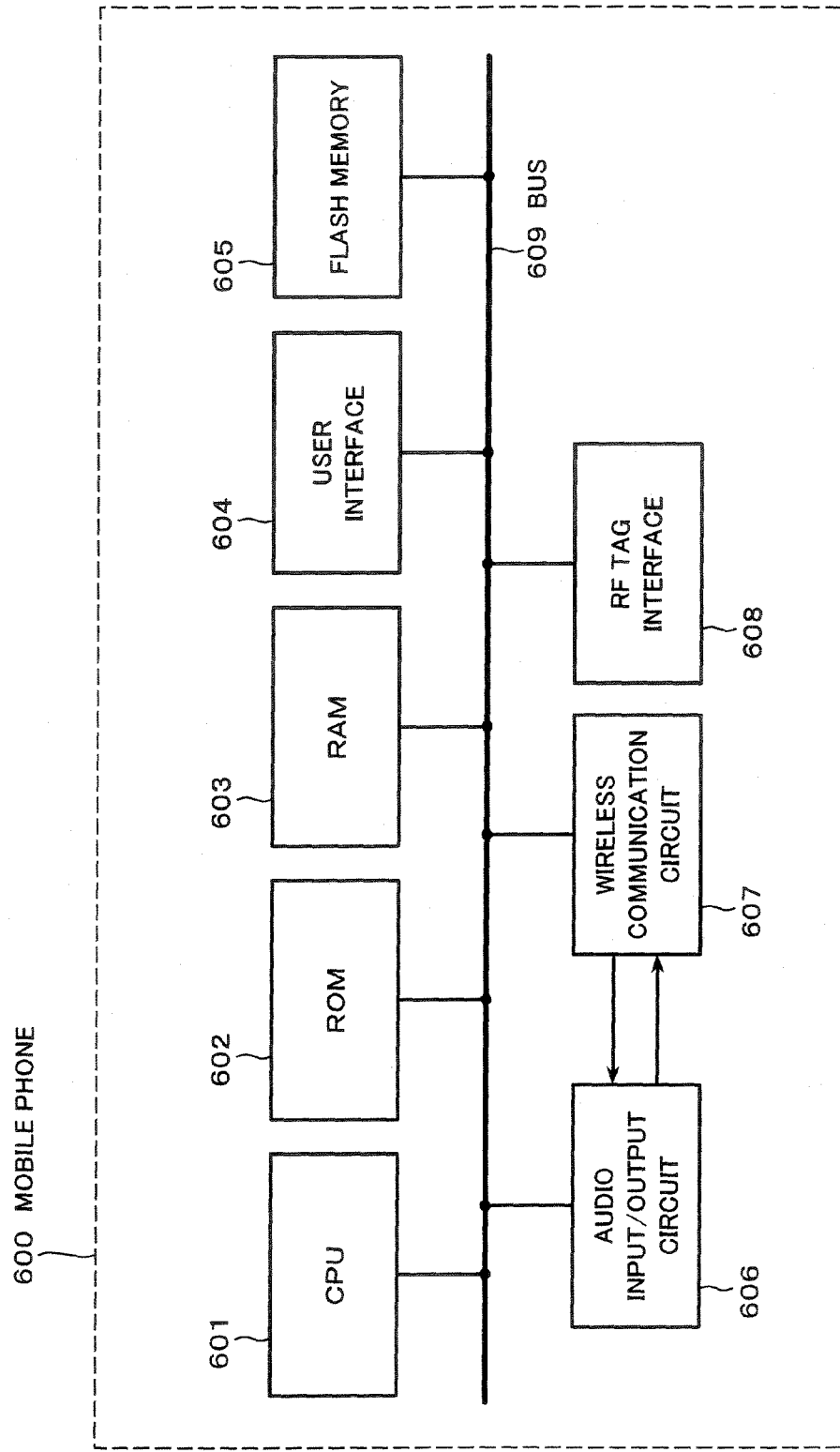
FIG. 15 is a schematic diagram showing a structure of which a function of wirelessly making a settlement of electronic money is embedded in a mobile phone.

An example of the latter case will be described with reference to FIG. 15. A mobile phone 600 is made up of a CPU 601, a ROM 602, a RAM 603, a flash memory 605, a user interface 604, an audio input/output circuit 606, a wireless communication circuit 607, an RF tag interface 608, and a bus 609 that mutually connects these structural elements.

The CPU 601 controls the operation of each structural element of the mobile phone 600 so as to accomplish both a function of a mobile phone and a function of a wireless electronic money settlement. The ROM 602 stores a program that accomplishes the function of the conventional mobile phone and the function of the wireless electronic money settlement. The CPU 601 controls each structural element according to commands issued by the operation of the program. The RAM 603 is used to temporarily store data while the program is operating.

The flash memory 605, which is a kind of a EEPROM, stores information of addresses used for the mobile phone and audio data and image data used in association with a settlement of electronic money. In this example, since the mobile phone 600 has both the function of the mobile phone and the function of the electronic money settlement, audio data that are output when a call is terminated and audio data that are output when a settlement of electronic money is made according to the present invention can be shared. In addition, the flash memory 605 stores user information and balance information used to make a settlement of electronic money.

The user interface 604 is disposed mainly for the mobile phone. The user interface 604 is for example push buttons used to input a telephone number and information and a display that indicates text information and image information. The audio input/output circuit 606 and the wireless communication circuit 607 are structural elements that accomplish the function of the mobile phone. A user's voice that is input from a microphone of the audio input/output circuit 606 is sent to the wireless communication circuit 607. The wireless communication circuit 607 converts the user's voice into predetermined data and wirelessly transmits the converted data to a base station according to a predetermined protocol. On the other hand, a voice of the communication party is sent from the base station and received by the wireless communication circuit 607. Thereafter, the audio input/output circuit 606 converts a received signal of the voice into an audio sound and provides the audio sound to the user.

The RF tag interface 608 controls communications with the reader/writer of electronic money, converts user information and balance information stored in the flash memory 605 into a transmission code, and transmits the converted data to the reader/writer. The balance information is updated on the basis of data transmitted from the reader/writer. As described above, the contactless IC card type electronic money obtains power from radio waves generated from the reader/writer. However, in this example, since the information processing system is incorporated in the mobile phone 600, communications with the reader/writer are made using a power supply of the mobile phone 600.

The invention claimed is:

1. An information processing system, comprising:
an information recording medium which records predetermined information; and
an information processing apparatus including circuitry that
provides price information of at least one of commodities and services,
reads the predetermined information recorded in the information recording medium, and
outputs at least one of different sounds and different images according to a sequence of operations related to a commercial transaction which a user of the information recording medium performs, the circuitry outputting the at least one of the different sounds and the different images based on a relationship between the price information of at least one of a selected commodity of the commodities and a selected service of the services, and the predetermined information read from the information recording medium, the circuitry outputting one of a sound of the different sounds and an image of the different images in response to a value of the price information of the at least one of the selected commodity and the selected service exceeding a value of balance information included in the information recording medium, wherein the at least one of the sounds and the images correspond to the user of the information recording medium in a customized fashion.

2. The information processing system as set forth in claim 1,
wherein the predetermined information contains identification information with which the information recording medium is identified, and
wherein the circuitry identifies one of sound data used to output the sounds and image data used to output the images according to the identification information.

3. The information processing system as set forth in claim 2,
wherein the predetermined information contains the one of the sound data and the image data, and
wherein the circuitry identifies one of sound data used to output the sounds and image data used to output the images from the one of the sound data and the image data contained in the predetermined information.

4. The information processing system as set forth in claim 2,
wherein the predetermined information contains the one of the sound data and the image data,
wherein the information processing apparatus further includes:
a memory that stores one of sound data and image data, and
wherein the circuitry determines whether one of sound data used to output the sounds and image data used to output the images are obtained from the memory or the predetermined information according to a predetermined condition.

5. The information processing system as set forth in claim 2,
wherein the information processing apparatus further includes:
a memory that stores one of sound data and image data,
wherein the circuitry identifies one of sound data used to output the sounds and image data used to output the images from the one of the sound data and the image data stored in the memory.

6. The information processing system as set forth in claim 1,
wherein the predetermined information contains one of sound data and image data, and
wherein the circuitry identifies one of sound data used to output the sounds and image data used to output the images from the one of the sound data and the image data contained in the predetermined information.

7. The information processing system as set forth in claim 1,
wherein the circuitry outputs one of the sounds and the images according to a predetermined condition, and
wherein the predetermined condition contains at least one of a condition about the predetermined information and a condition about the operations which the user performs.

8. The information processing system as set forth in claim 7,
wherein the predetermined information contains user information about the user of the information recording medium.

9. The information processing system as set forth in claim 7,
wherein the circuitry further obtains environmental information, and
wherein the predetermined condition contains at least one of a condition about the predetermined information, a condition about the operations which the user performs, and a condition about the environmental information.

10. The information processing system as set forth in claim 7,
wherein the information recording medium is used as electronic money, and
wherein the predetermined information contains the balance information, which is of electronic money.

11. The information processing system as set forth in claim 7,
wherein the predetermined condition is assigned a predetermined priority order, and
wherein an output of one of the sounds and the images is controlled according to the predetermined priority order.

12. The information processing system as set forth in claim 7,
wherein the circuitry selects different one of sound data and image data as data used to output the one of the sounds and the images when the one of the sounds and the images that differ according to the predetermined condition is output.

13. The information processing system as set forth in claim 7,
wherein the circuitry processes or transforms one of sound data and image data used to output the one of the sounds and the images when the one of the sounds and the images which differ according to the predetermined condition is output.

14. The information processing system as set forth in claim 1,
wherein the information recording medium and the information processing apparatus are each configured to perform wireless communication, and
wherein the information processing apparatus contactlessly reads the predetermined information from the information recording medium.

15. The information processing system as set forth in claim 14,
wherein the information recording medium is an IC card.

16. The information processing system as set forth in claim 15,
wherein the IC card is used as electronic money, and
wherein the predetermined information contains the balance information, which is of the electronic money.

17. The information processing system as set forth in claim 16,
wherein the operations which the user performs include an operation of using the IC card and buying the at least one of the selected commodity and the selected service with the electronic money, and
wherein the circuitry further automatically rewrites balance information of the IC card according to the operations which the user performs, and automatically provides the at least one of the selected commodity and the selected service according to the operations which the user performs.

18. The information processing system as set forth in claim 16,
wherein the operations which the user performs include an operation of charging the IC card with electronic money, and
wherein the circuitry further automatically rewrites balance information of the IC card according to the operations which the user performs.

19. The information processing system as set forth in claim 1, wherein
a volume of the sounds is at least one of increased and decreased based on weather conditions, in response to the circuitry outputting the sounds, and
a brightness of the images is at least one of increased and decreased based on the weather conditions, in response to the circuitry outputting the images.

20. The information processing system as set forth in claim 1, wherein the circuitry outputs both the sounds and the images at different times during the sequence of operations related to the commercial transaction.

21. The information processing system as set forth in claim 1, wherein
a volume of the sounds is at least one of increased and decreased based on weather conditions, in response to the circuitry outputting the sounds, or
a brightness of the images is at least one of increased and decreased based on the weather conditions, in response to the circuitry outputting the images.

22. The information processing system as set forth in claim 1, wherein
a volume of the sounds is at least one of increased and decreased based on information corresponding to a location of the information processing apparatus, in response to the circuitry outputting the sounds, and
a brightness of the images is at least one of increased and decreased based on the information corresponding to the location of the information processing apparatus, in response to the circuitry outputting the images.

23. An information processing apparatus comprising:
a processor that
provides price information of at least one of commodities and services,
reads predetermined information recorded in an information recording medium, and
outputs at least one of different sounds and different images according to a sequence of operations related to a commercial transaction which a user of the information recording medium performs, the processor outputting the at least one of the different sounds and the different images based on a relationship between the price information of at least one of a selected commodity of the commodities and a selected service of the services, and the predetermined information read from the information recording medium, the processor outputting one of a sound of the different sounds and an image of the different images in response to a value of the price information of the at least one of the selected commodity and the selected service exceeding a value of balance information included in the information recording medium, wherein the at least one of the sounds and the images correspond to the user of the information recording medium in a customized fashion.

24. The information processing apparatus as set forth in claim 23, wherein the predetermined information contains identification information with which the information recording medium is identified, and wherein the processor identifies one of sound data used to output the sounds and image data used to output the images according to the identification information.

25. The information processing apparatus as set forth in claim 24, wherein the predetermined information contains the one of the sound data and the image data, and wherein the processor identifies one of sound data used to output the sounds and image data used to output the images from the one of the sound data and the image data contained in the predetermined information.

26. The information processing apparatus as set forth in claim 24, further comprising:

a memory that stores one of sound data and image data, wherein the predetermined information contains the one of the sound data and the image data, and wherein the processor determines whether one of sound data used to output the sounds and image data used to output the images are obtained from the memory or the predetermined information according to a predetermined condition.

27. The information processing apparatus as set forth in claim 24, further comprising:

a memory that stores one of sound data and image data, wherein the processor identifies one of sound data used to output the sounds and image data used to output the images from the one of the sound data and the image data stored in the memory.

28. The information processing apparatus as set forth in claim 23, wherein the predetermined information contains one of sound data and image data, and wherein the processor identifies one of sound data used to output the sounds and image data used to output the images from the one of the sound data and the image data contained in the predetermined information.

29. The information processing apparatus as set forth in claim 23, wherein the processor outputs the one of the sounds and the images according to a predetermined condition, and wherein the predetermined condition contains at least one of a condition about the predetermined information and a condition about the operations which the user performs.

30. The information processing apparatus as set forth in claim 29, wherein the predetermined information contains user information about the user of the information recording medium.

31. The information processing apparatus as set forth in claim 29, wherein the processor obtains environmental information, wherein the predetermined condition contains at least one of a condition about the predetermined information, a condition about the operations which the user performs, and a condition about the environmental information.

32. The information processing apparatus as set forth in claim 29, wherein the information recording medium is used as electronic money, and wherein the predetermined information contains the balance information, which is of electronic money.

33. The information processing apparatus as set forth in claim 29, wherein the predetermined condition is assigned a predetermined priority order, and wherein an output of the one of the sounds and the images is controlled according to the predetermined priority order.

34. The information processing apparatus as set forth in claim 29, wherein the processor selects one of different sound data and image data as data used to output the one of the sounds and the images when the one of the sounds and the images that differ according to the predetermined condition is output.

35. The information processing apparatus as set forth in claim 29, wherein the processor processes or transforms one of sound data and image data used to output the one of the sounds and the images when the one of the sounds and the images which differ according to the predetermined condition is output.

36. The information processing apparatus as set forth in claim 23, wherein the information recording medium and the information processing apparatus are each configured to perform wireless communication, and wherein the information processing apparatus contactlessly reads the predetermined information from the information recording medium.

37. The information processing apparatus as set forth in claim 36, wherein the information recording medium is an IC card.

38. The information processing apparatus as set forth in claim 37, wherein the IC card is used as electronic money, and wherein the predetermined information contains the balance information, which is of the electronic money.

39. The information processing apparatus as set forth in claim 38, wherein the operations which the user performs include an operation of using the IC card and buying the at least one of the selected commodity and the selected service with the electronic money, and wherein the processor further automatically rewrites balance information of the IC card according to the operations which the user performs, and automatically provides the at least one of the selected commodity and the selected service according to the operations which the user performs.

40. The information processing apparatus as set forth in claim 38, wherein the operations which the user performs include an operation of charging the IC card with electronic money, and wherein the processor further automatically rewrites balance information of the IC card according to the operations which the user performs.

41. An information processing method comprising the steps of:

providing price information of at least one of commodities and services;

reading predetermined information recorded in an information recording medium; and outputting at least one of different sounds and different images according to a sequence of operations related to a commercial transaction which a user of the information recording medium performs, the outputting step being performed by outputting the at least one of the different sounds and the different images based on a relationship between the price information of at least one of a selected commodity of the commodities and a selected service of the services, and the predetermined information read at the reading step, the outputting step outputting one of a sound of the different sounds and an image of the different images in response to a value of the price information of the at least one of the selected commodity and the selected service exceeding a value of balance information included in the information recording medium, wherein the at least one of the sounds and the images correspond to the user of the information recording medium in a customized fashion.

42. The information processing method as set forth in claim 41,
wherein the predetermined information contains identification information with which the information recording medium is identified, and
wherein the outputting step is performed by identifying one of sound data used to output the sounds and image data used to output the images according to the identification information.

43. The information processing method as set forth in claim 42,
wherein the predetermined information contains the one of the sound data and the image data, and
wherein the outputting step is performed by identifying one of sound data used to output the sounds and image data used to output the images from the one of the sound data and the image data contained in the predetermined information.

44. The information processing method as set forth in claim 42,
wherein the predetermined information contains the one of the sound data and the image data, and
wherein the outputting step is performed by determining whether one of sound data used to output the sounds and image data used to output the images are obtained from a memory that stores one of sound data and image data or the predetermined information according to a predetermined condition.

45. The information processing method as set forth in claim 42,
wherein the outputting step is performed by identifying one of sound data used to output the sounds and image data used to output the images from the one of the sound data and the image data stored in a memory.

46. The information processing method as set forth in claim 41,
wherein the predetermined information contains one of sound data and image data, and
wherein the outputting step is performed by identifying one of sound data used to output the sounds and image data used to output the images from the one of the sound data and the image data contained in the predetermined information.

47. The information processing method as set forth in claim 41,
wherein the outputting step is performed by outputting the one of the sounds and the images according to a predetermined condition, and
wherein the predetermined condition contains at least one of a condition about the predetermined information and a condition about the operations which the user performs.

48. The information processing method as set forth in claim 47,
wherein the predetermined information contains user information about the user of the information recording medium.

49. The information processing method as set forth in claim 47, further comprising the step of:
obtaining environmental information,
wherein the predetermined condition contains at least one of a condition about the predetermined information, a condition about the operations which the user performs, and a condition about the environmental information.

50. The information processing method as set forth in claim 47,
wherein the information recording medium is used as electronic money, and
wherein the predetermined information contains the balance information, which is of electronic money.

51. The information processing method as set forth in claim 47,
wherein the predetermined condition is assigned a predetermined priority order, and
wherein an output of the one of the sounds and the images is controlled according to the predetermined priority order.

52. The information processing method as set forth in claim 47,
wherein the outputting step is performed by selecting one of different sound data and image data as data used to output the one of the sounds and the images when the one of the sounds and the images that differ according to the predetermined condition is output.

53. The information processing method as set forth in claim 47,
wherein the outputting step is performed by processing or transforming one of sound data and image data used to output the one of the sounds and the images when the one of the sounds and the images which differ according to the predetermined condition is output.

54. The information processing method as set forth in claim 41,
wherein the reading step is performed by contactlessly reading the predetermined information from the information recording medium through wireless communications.

55. The information processing method as set forth in claim 54,
wherein the information recording medium is an IC card.

56. The information processing method as set forth in claim 55,
wherein the IC card is used as electronic money, and
wherein the predetermined information contains the balance information, which is of the electronic money.

57. The information processing method as set forth in claim 56,
wherein the operations which the user performs include an operation of using the IC card and buying the at least one of the selected commodity and the selected service with the electronic money, and
wherein the information processing method further comprises the steps of:
automatically rewriting balance information of the IC card according to the operations which the user performs; and
automatically providing the at least one of the selected commodity and the selected service according to the operations which the user performs.

58. The information processing method as set forth in claim 56, wherein the operations which the user performs include an operation of charging the IC card with electronic money, and wherein the information processing method further comprises the step of:

automatically rewriting balance information of the IC card according to the operations which the user performs.

59. A non-transitory computer-readable storage medium including computer executable instructions, wherein the instructions, when executed by a computer, cause the computer to perform a method, the method comprising:

reading predetermined information including at least one of sound data and image data recorded in an information recording medium;

providing price information of at least one of commodities and services; and outputting at least one of different sounds and different images with the at least one of the sound data and the image data when a user of the information recording medium performs a sequence of operations related to a commercial transaction the outputting step outputting the at least one of the different sounds and the different images based on a relationship between the price information of at least one of a selected commodity of the commodities and a selected service of the services, and the predetermined information, the outputting step outputting one of a sound of the different sounds and an image of the different images in response to a value of the price information of the at least one of the selected commodity and the selected service exceeding a value of balance information included in the information recording medium, wherein the at least one of the sounds and the images correspond to the user of the information recording medium in a customized fashion.

60. The non-transitory computer-readable storage medium as set forth in claim 59, wherein the outputting step outputs the one of the sounds and the images according to a predetermined condition, and wherein the predetermined condition contains at least one of a condition about the predetermined information and a condition about the operations which the user performs.

61. The non-transitory computer-readable storage medium as set forth in claim 60, wherein the predetermined information contains user information about the user of the information recording medium.

62. The non-transitory computer-readable storage medium as set forth in claim 60, wherein the predetermined condition contains at least one of a condition about the predetermined information, a condition about the operations which the user performs, and a condition about environmental information.

63. The non-transitory computer-readable storage medium as set forth in claim 60, wherein the information recording medium is used as electronic money, and wherein the predetermined information contains the balance information, which is of electronic money.

64. The non-transitory computer-readable storage medium as set forth in claim 60, wherein the predetermined condition is assigned a predetermined priority order, and wherein the outputting step controls an output of the one of the sounds and the images according to the predetermined priority order.

65. The non-transitory computer-readable storage medium as set forth in claim 59, wherein wherein the reading step contactlessly reads the predetermined information.

66. The non-transitory computer-readable storage medium as set forth in claim 65, wherein the information recording medium is an IC card.

67. The non-transitory computer-readable storage medium as set forth in claim 66, wherein the IC card is used as electronic money, and wherein the predetermined information contains the balance information, which is of the electronic money.

68. The non-transitory computer-readable storage medium as set forth in claim 67, wherein the operations which the user performs include an operation of using the IC card and buying the at least one of the selected commodity and the selected service with the electronic money, and wherein the non-transitory computer-readable storage medium further comprises:

automatically rewriting balance information of the IC card according to the operations which the user performs; and automatically providing the at least one of the selected commodity and the selected service according to the operations which the user performs.

69. The non-transitory computer-readable storage medium as set forth in claim 67, wherein the operations which the user performs include an operation of charging the IC card with electronic money, and wherein the the non-transitory computer-readable storage medium further comprises:

automatically rewriting balance information of the IC card according to the operations which the user performs.

70. The non-transitory computer-readable storage medium as set forth in claim 65, wherein the information recording medium is incorporated in a portable device.

71. An information processing system, comprising:

an information recording medium which records predetermined information; and an information processing apparatus including circuitry configured to read the predetermined information recorded in the information recording medium, and output at least one of different sounds and different images according to a sequence of operations related to a commercial transaction which a user of the information recording medium performs, the circuitry outputting the at least one of the different sounds and the different images based on a relationship between price information of at least one of a selected commodity of commodities and a selected service of services, and the predetermined information read from the information recording medium, the circuitry outputting one of a sound of the different sounds and an image of the different images in response to a value of the price information of the at least one of the selected commodity and the selected service exceeding a value of balance information included in the information recording medium, wherein the at least one of the sounds and the images correspond to the user of the information recording medium in a customized fashion.

72. An information processing apparatus, comprising:

a price information unit configured to provide price information of at least one of commodities and services;

an information reading unit configured to read predetermined information recorded in an information recording medium; and an output unit configured to output at least one of different sounds and different images according to a sequence of operations related to a commercial transaction which a user of the information recording medium performs, the output unit outputting the at least one of the different sounds and the different images based on a relationship between the price information of at least one of a selected commodity of the commodities and a selected service of the services, and the predetermined information read from the information recording medium, the output unit outputting one of a sound of the different sounds and an image of the different images in response to a value of the price information of the at least one of the selected commodity and the selected service exceeding a value of balance information included in the information recording medium, wherein the at least one of the sounds and the images correspond to the user of the information recording medium in a customized fashion.

* * * * *